United States Patent
Bernardini et al.

(10) Patent No.: US 6,750,873 B1
(45) Date of Patent: Jun. 15, 2004

(54) HIGH QUALITY TEXTURE RECONSTRUCTION FROM MULTIPLE SCANS

(75) Inventors: Fausto Bernardini, New York, NY (US); Ioana M. Martin, Mohegan Lake, NY (US); Holly E. Rushmeier, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 09/603,928

(22) Filed: Jun. 27, 2000

(51) Int. Cl.$^7$ ................................................. G06K 9/00
(52) U.S. Cl. ...................... 345/582; 345/581; 345/586; 345/606; 345/629; 382/294; 382/295
(58) Field of Search ................................. 345/582, 586, 345/581, 589, 606, 609, 419, 639, 629; 382/154, 108, 294, 295, 296, 298

(56) References Cited

U.S. PATENT DOCUMENTS

| | | | | |
|---|---|---|---|---|
| 5,381,526 A | * | 1/1995 | Ellson ........................ | 345/530 |
| 5,579,456 A | * | 11/1996 | Cosman ...................... | 345/419 |
| 5,715,166 A | | 2/1998 | Besl et al. ............. | 364/474.24 |
| 5,986,668 A | | 11/1999 | Szeliski et al. ............. | 345/433 |
| 5,995,650 A | * | 11/1999 | Migdal et al. .............. | 345/419 |
| 6,009,190 A | | 12/1999 | Szeliski et al. ............. | 382/154 |
| 6,049,636 A | * | 4/2000 | Yang ......................... | 382/289 |
| 6,256,038 B1 | * | 7/2001 | Krishnamurthy ............ | 345/419 |
| 6,271,847 B1 | * | 8/2001 | Shum et al. ................ | 345/418 |
| 6,362,821 B1 | * | 3/2002 | Gibson et al. .............. | 345/424 |
| 6,469,710 B1 | * | 10/2002 | Shum et al. ................ | 345/619 |
| 6,476,803 B1 | * | 11/2002 | Zhang et al. ............... | 345/419 |

OTHER PUBLICATIONS

"Surface Reconstruction and Display from Range and Color Data" by Pulli, Dissertation submitted in partial fulfillment of the requirements for the degree of Doctor of Philosophy, University of Washington, 1997, pps. 1–117.
"Towards a General Multi–View Registration Technique" by Bergevin et al., IEEE Transactions on Pattern Analysis and Machine Intelligence, vol. 18, No. 5, May 1996, pps. 540–547.
"Object Modeling by Registration of Multiple Range Images" by Chen et al., Institute for Robotics and Intelligent Systems, Apr. 1991, pps. 2724–2729.
"A Method for Registration of 3–D Shapes" by Besl et al., IEEE Transactions on Pattern Analysis and Machine Intelligence, vol. 14, No. 2, Feb. 1992, pps. 239–256.

(List continued on next page.)

*Primary Examiner*—Matthew Luu
*Assistant Examiner*—Daniel Chung
(74) *Attorney, Agent, or Firm*—Ohlandt, Greeley, Ruggiero & Perle, L.L.P.; Louis Percello

(57) ABSTRACT

A system and method is disclosed for constructing a digital model of an object. The system includes an imaging system for generating object surface scan data from a plurality of surface scans, the surface scan data having a first resolution and representing the object from a plurality of viewpoints. The imaging system further generates image data having a second, higher resolution than the surface scan data for representing the object from the plurality of viewpoints. The system further includes a data processor for iteratively registering the surface scan data for the plurality of surface scans, using the image data, and for reconstructing substantially seamless surface texture data for the model using weights that reflect a level of confidence in the data at a plurality of surface points.

25 Claims, 19 Drawing Sheets

OTHER PUBLICATIONS

"A Computer–Assisted Range Image Registration System for Nuclear Waste Cleanup" by Gagnon et al., IEEE Transactions on Instrumentation and Measurement, vol. 48, No. 3, Jun. 1999, pps. 758–762.

"The Digital Michelangelo Projects: 3D Scanning of Large Statues" by Levoy et al. Proc. Siggraph, 2000, pps. 1–14.

"Multi–Feature Matching Algorithm for Free–Form 3D Surface Registration" by Schultz et al., Institute for Microtechnology, Neuchatel, Switzerland, 1998.

"Building Models From Sensor Data: An Application Shared by the Computer vision and the Computer Graphics Community" by Gerhard Roth, Visual Information Technology Group, National Research Council of Canada, pps. 1–9, undated.

"Computing Consistent Normals and Colors from Photometric Data" by Rushmeier et al., IBM Thomas J. Watson Research Center, Oct. 1999.

"Acquisition and Visualization of Colored 3D Objects" by Abi–Rached et al., University of Washington, undated.

"Texturing 3D Models of Real World Objects from Multiple Unregistered Photographic Views" by Nuegebauer et al., Fraunhofer Institute for Computer Graphics, vol. 18, No. 3, 1999, pps. 245–256.

* cited by examiner

Input: scans to be registered: $S_1, \ldots, S_N$
initial registration matrices: $M_1, \ldots, M_N$
detail maps: $D_1, \ldots, D_N$
depth maps: $Z_1, \ldots, Z_N$
bounding boxes: $B_1, \ldots, B_N$
lists of sample points: $L_1, \ldots, L_N$
where $L_m = \{(t_m, p_m) | t_m \in D_m, p_m \in S_m\}$
camera parameters: $C$ Output: accurate registration matrices: $M_1, \ldots, M_N$ Algorithm *Image-Based Registration*

1. read $B_1, \ldots, B_N$
2. while (*convergence criterion not satisfied*)
3.    $(m_1, \ldots, m_N) = random\_permutation\,(2, \ldots, N)$
4.    for $(m = m_1, \ldots, m_N)$
5.       $C_m = camera\,(M_m, C)$
6.       $register\_scan\,(m, C_m)$ Procedure *register_scan* $(m, C_m)$ 1. read $D_m, Z_m, L_m$
2. for $(i = 1, \ldots, N)$ and $(i \neq m)$
3.    read $S_i, D_i$
4.    if $(B_m$ intersects $B_i)$
5.       $\tilde{D}_i = project\_scan\,(S_i, D_i, C_m)$
6.       $O_{mi} = compute\_image\_overlap\,(D_m, \tilde{D}_i)$
7.       if $(|O_{mi}| > min\_overlap)$
8.          for $((t_m, p_m) \in L_m)$ and $(t_m \in O_{mi})$
9.             $t_i = t_m$
10.             $b_i = find\_best\_match\,(t_m, D_m, t_i, \tilde{D}_i)$
11.             $p_i = back\_project\,(b_i, S_i, C_m) \in S_i$
12.             $insert\_pair\,(p_m, p_i, pairs\_list)$
13. if $(|pairs\_list| \geq 3)$
14.    $M_m = compute\_rigid\_transform\,(pairs\_list)$

Fig. 4

$$s_{mm} = \sum D_m(t_m^k)^2 - \frac{1}{n}[\sum D_m(t_m^k)]^2,$$

$$s_{ii} = \sum \tilde{D}_i(t_i^k)^2 - \frac{1}{n}[\sum D_i(t_i^k)]^2,$$

$$s_{mi} = \sum D_m(t_m^k)^2 \tilde{D}_i(t_i^k) - \frac{1}{n}\sum D_m(t_m^k) \sum \tilde{D}_i(t_i^k).$$

Fig. 10A  Fig. 10B
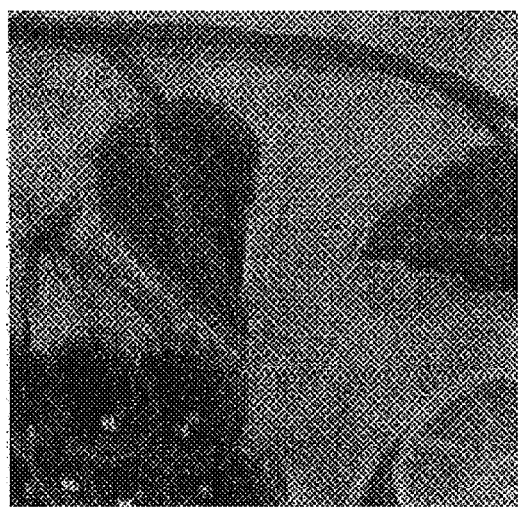
Fig. 10C  Fig. 10D

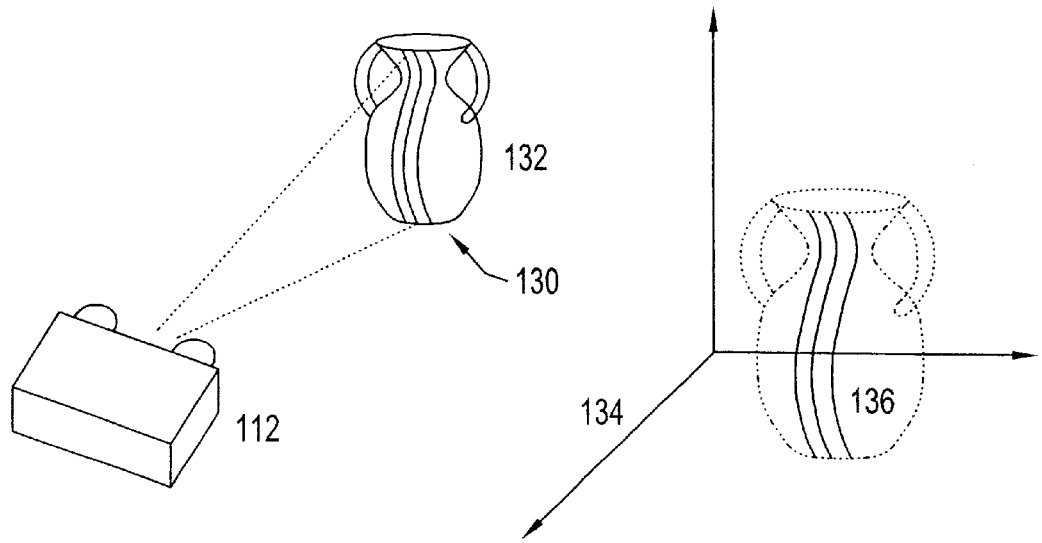
Fig. 11D
Fig. 11E
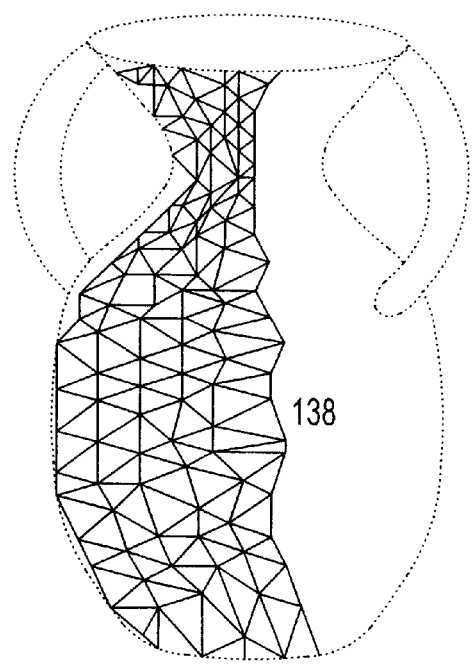
Fig. 11F
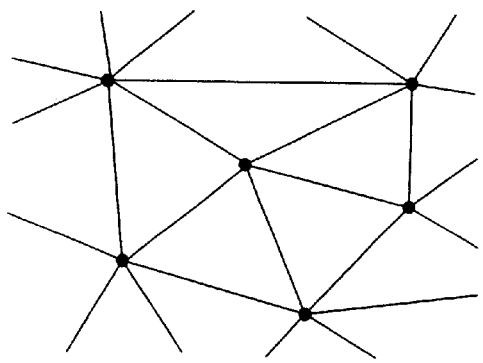
Fig. 11G

HIGH QUALITY TEXTURE RECONSTRUCTION FROM MULTIPLE SCANS

FIELD OF THE INVENTION

This invention relates generally to methods and apparatus for generating displayable digital models of physical objects, and in particular relates to such methods and apparatus that operate based on object surface scan and image data.

BACKGROUND OF THE INVENTION

The creation of three-dimensional digital content by scanning real objects has become common practice in graphics applications for which visual quality is paramount, such as animation, e-commerce, and virtual museums. While a significant amount of attention has been devoted to the problem of accurately capturing the geometry of scanned objects, the acquisition of high-quality textures is equally important, but not as widely studied.

Three-dimensional scanners are used increasingly to capture digital models of objects for animation, virtual reality, and e-commerce applications for which the central concerns are efficient representation for interactivity and high visual quality.

Most high-end 3D scanners sample the surface of the target object at a very high resolution. Hence, models created from the scanned data are often over-tesselated, and require significant simplification before they can be used for visualization or modeling. Texture data is often acquired together with the geometry, however a typical system merely captures a collection of images containing the particular lighting conditions at the time of scanning. When these images are stitched together, discontinuity artifacts are usually visible. Moreover, it is rather difficult to simulate various lighting conditions realistically, or to immerse the model in a new environment.

A variety of techniques can be used to capture digital models of physical objects, including CAT scans and structure from motion applied to video sequences. The following description has been restricted for convenience to techniques involving instruments that capture range images (in which each pixel value represents depth) and intensity images (in which each pixel is proportional to the incident light). A detailed summary of such methods can be found in G. Roth, "Building models from sensor data:an application shared by the computer vision and computer graphics community", In Proc. of the NATO Workshop on the Confluence of Computer Vision and Computer Graphics, 2000.

The basic operations necessary to create a digital model from a series of captured images are illustrated in FIG. 1. After outliers are removed from the range images, they are in the form of individual height-field meshes. Step A is to align these meshes into a single global coordinate system. In high-end systems registration may be performed by accurate tracking. For instance, the scanner may be attached to a coordinate measurement machine that tracks its position and orientation with a high degree of accuracy. In less expensive systems an initial registration is found by scanning on a turntable, manual alignment, or approximate feature matching. The alignment is then refined automatically using techniques such as the Iterative Closest Point (ICP) algorithm of Besl and McKay.

After registration, scans do not form a single surface, but interpenetrate one another, due to acquisition errors primarily along the line-of-sight in each scan. To form a single surface, in step B the overlapping scans must be averaged. In stitching/zippering methods this averaging is performed between pairs of overlapping meshes. In volumetric/occupancy grid methods line-of-sight errors are averaged by letting all scanned points contribute to a function of surface probability defined on a single volume grid. An advantage of volumetric methods is that all scans representing a surface point influence the final result, rather than simply a pair of scans.

In step B the scans are integrated into a single mesh. The integration may be performed by zippering/stitching, isosurface extraction from volumes, or interpolating mesh algorithms applied to error-corrected points.

To use a texture map with the integrated mesh, in step C the surface is parameterized with respect to a 2D coordinate system and texture coordinates are interpolated between mesh vertices. A simple parameterization is to treat each triangle separately and to pack all of the individual texture maps into a larger texture image. However, the use of mip-mapping in this case is limited since adjacent pixels in the texture may not correspond to adjacent points on the geometry. Another approach is to locate patches of geometry which are height fields that can be parameterized by projecting the patch onto a plane. Stitching methods use this approach by simply considering sections of the scanned height fields as patches.

Other methods could be built on tiling methods developed for multiresolution analysis or interactive texture mapping.

Parallel to acquiring the geometry of the model, intensity images are captured to obtain information about the reflectance of the surface. Such images may be recorded with electronic or traditional cameras, or by using polychromatic laser technology. In step D, these images are aligned to the corresponding geometry. In some cases the image acquisition is decoupled from the geometry acquisition. The camera intrinsic and extrinsic parameters for the images are estimated by manual or automatic feature matching. The advantage is that acquisition modalities that cannot capture surface reflectance can be used for capturing geometry.

In most cases, however, the alignment is performed by calibration. Geometry and intensity are captured simultaneously from scanners with a measured transformation between sensing devices. The resolution of the intensity image may be the same as that of the range image or even higher. When the resolution is the same, texture mapping is unnecessary since a color can be assigned to each vertex. Nevertheless, such a representation is inefficient, and geometric simplification is typically performed before the surface parameterization step.

The main benefit of obtaining intensity and range images simultaneously is that the intensity information can be used in the registration process in step A. Various approaches have been developed to use intensity images in registration. For example, it is known to use color as an additional coordinate in the ICP optimization. This avoids local minima in the solution in areas that have no geometric features, but have significant variations in the intensity. For models with pronounced geometric and intensity features, the method has proven to be very effective. A drawback is having to combine position and color data with different ranges and error characteristics. For subtle feature variations, these can cause one type of data to erroneously overwhelm the other.

It is also known to use intensity images to avoid the spatial search required by ICP. Intensity and intensity gradient images from approximately aligned scans are transformed into a common camera view. Locations of corresponding points on overlapping scans are inferred based on the difference between intensity values at a given pixel and the gradient at that pixel. This method works well only if the spatial variation of the gradient is small relative to errors in the alignment of the scans.

It is also known to present a non-ICP method for using intensity images to refine an initial manual alignment. In this approach pairs of range images are aligned manually by marking three points on overlapping intensity images. The locations of the matching points are refined by searching their immediate neighborhoods with image cross-correlation. A least-squares optimization follows to determine a general 3D transformation that minimizes the distances between the point pairs. Image registration techniques are also used for image mosaics in which only rotations or translations are considered.

After the intensity images are aligned to the geometry, illumination invariant maps are computed to estimate the surface reflectance (step E). The number of scans versus the number of intensity images, as well as the resolution of the scans compared to the resolution of the images are considered at this stage. For a small number of scans and a large number of intensity images obtained under calibrated lighting conditions, a full Bidirectional Reflectance Distribution Function (BRDF) can be estimated.

If many scans are required to represent an object, and only a few high-resolution intensity images are captured per scan, photometric stereo techniques can be used to estimate Lambertian reflectance. Alternatively, if the range and intensity images have the same resolution, the geometry can be used to compute reflectance from a single image.

In step F the final texture is reconstructed. The illumination invariant maps are projected onto the integrated, parametrized surfaces. The main concerns at this step are that the final texture is as sharp as the best input images, that seams between scans or height-field patches are not visible, and that all information available is fully exploited to maximize the signal-to-noise ratio.

To maintain sharpness, a stitching approach has been proposed that uses a single illumination invariant map at any given surface point. Continuity in sharp features between adjoining maps is maintained by a local texture adjustment at texture boundaries. However, this approach requires high-quality input maps that have no visible noise and no scan-to-scan chromatic differences. Map adjustment techniques such as this, as well as de-ghosting methods for image mosaics, decouple texture from geometric variations. This may cause noticeable artifacts when these variations are correlated (e.g., dents and scratches that reveal underlying material with different reflectance properties.)

To avoid jumps in color appearance and to reduce noise, it is known to combine information from multiple overlapping scans. In this case, however, if texture alignment is imperfect then blurring or ghosting artifacts may be generated.

Reference can be had to K. Pulli, "Surface reconstruction and display from range and color data", PhD Thesis, Dept. of Computer Science and Engineering, Univ. of Washington, December 1997.

In general, this approach uses intensity images to pair points from overlapping scans. With the assumption that two scans are already roughly aligned, Pulli's method starts by rendering the second scan, textured with its own intensity image, from the viewpoint of the first image. A planar perspective warping of the first image is then computed to match the rendered image of the second scan. For each corresponding pixel of the two images, under the computed transformation, a pair of points from the two scans is generated. A least-squares optimization is then performed to compute a registration matrix. The process is iterated until a convergence criterion is satisfied. Pulli also discusses an extension for multi-view registration.

Reference may also be made to K. Pulli et al., "Acquisition and Visualization of Colored 3D Objects", ICPR 1998, for a description of a system for scanning geometry and the surface color. The data is registered and a surface that approximates the data is constructed. It is said that the surface estimate can be fairly coarse, as the appearance of fine detail is recreated by view-dependent texturing of the surface using color images. This process uses three different weights (directional, sampling quality and feathering) when averaging together the colors of compatible rays.

Pulli et al. do not explicitly form texture images associated with geometry, but propose a dynamic, view-dependent texturing algorithm which determines a subset of the original images taken from a view direction that is close to the current view, and the synthesis of new color images from the model geometry and input images.

Based on the foregoing, it can be readily appreciated that a need exists for improved methods to construct accurate digital models of multi-scanned objects, in particular digital models that exhibit high-quality texture.

OBJECTS AND ADVANTAGES OF THE INVENTION

It is a first object and advantage of this invention to provide an improved method and apparatus for constructing accurate digital models that exhibit high-quality surface texture.

It is a further object and advantage of this invention to provide an improved method and apparatus for constructing, from object scan data, an accurate digital model of the object that exhibits high-quality surface texture.

SUMMARY OF THE INVENTION

The foregoing and other problems are overcome and the objects of the invention are realized by methods and apparatus in accordance with embodiments of this invention.

Disclosed herein are methods to construct accurate digital models of scanned objects by integrating high-quality texture and normal maps with geometric data. These methods can be used with inexpensive, electronic camera-based systems in which low-resolution range images and high-resolution intensity images are acquired. The resulting models are well-suited for interactive rendering on the latest-generation graphics hardware with support for bump mapping. In general, bump mapping refers to encoding small scale geometry in an image. The large scale geometry contains pointers to the bump map image that are used by the computer graphics hardware to display both large and small scale geometry.

The inventive methods provide techniques for processing range, albedo, and surface normal data, for image-based registration of scans, and for reconstructing high-quality textures for the output digital object.

The scanning system used during the execution of the methods described herein was equipped with a high-resolution digital color camera that acquires intensity images under controlled lighting conditions. Detailed normal and albedo maps of the surface are computed based on these images. By comparison, geometry is captured at lower resolution, typically at a resolution that is sufficient to resolve only the major shape features.

The benefits of such a system are twofold. First, it allows for the use of relatively inexpensive hardware by eliminating the nee d for dense geometric sampling, and by taking advantage of digital color cameras that are quickly gaining in resolution while dropping in price. Second, the generated models are more readily usable in a visualization or modeling environment that exploits the hardware-assisted bump mapping feature increasingly available in commercial-grade 3D accelerators.

In general, the issue of acquiring and reconstructing high-quality texture maps has received less attention than the issue of capturing high-quality geometry. The inventors have built upon existing techniques developed for texture acquisition, reconstruction, and image registration to generate maps of high visual quality for the scanned objects. Particularly because the noise and inaccuracies of a lower-cost scanner are greater than those of high-end, more expensive systems, it is desirable to exploit in full all of the geometric and image information acquired to improve the visual quality of the final representation.

A novel texture reconstruction framework is disclosed that uses illumination-invariant albedo and normal maps derived from calibration-registered range and intensity images. The albedo maps are used in a unique way to refine a geometry-only registration of the individual range images. After the range data is integrated into a single mesh, the resulting object is partitioned into a set of height-field patches. New textures are synthesized by projecting the maps onto the patches and combining the best data available at each point using weights that reflect the level of confidence in the data. The weighted averaging lowers noise present in the images, while the fine registration avoids blurring, ghosting, and loss of fine texture details.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 depicts a pseudocode representation of the image-based registration algorithm in accordance with the teachings herein;

FIG. 8A illustrates a two-dimensional diagram of texture remapping, while

FIGS. 10A–10E are examples of a vase data set example, while

FIG. 11D is an example of the operation of the 3D scanner;

FIG. 11E shows the result of acquiring multiple stripes;

FIG. 11F shows, in the scan integration phase, the computation of a triangular mesh;

FIG. 11G shows a closeup view of the computed triangular mesh;

FIG. 12A is a logic flow diagram of the image-based registration method in accordance with this invention, while

DETAILED DESCRIPTION OF THE INVENTION

Figure 2:
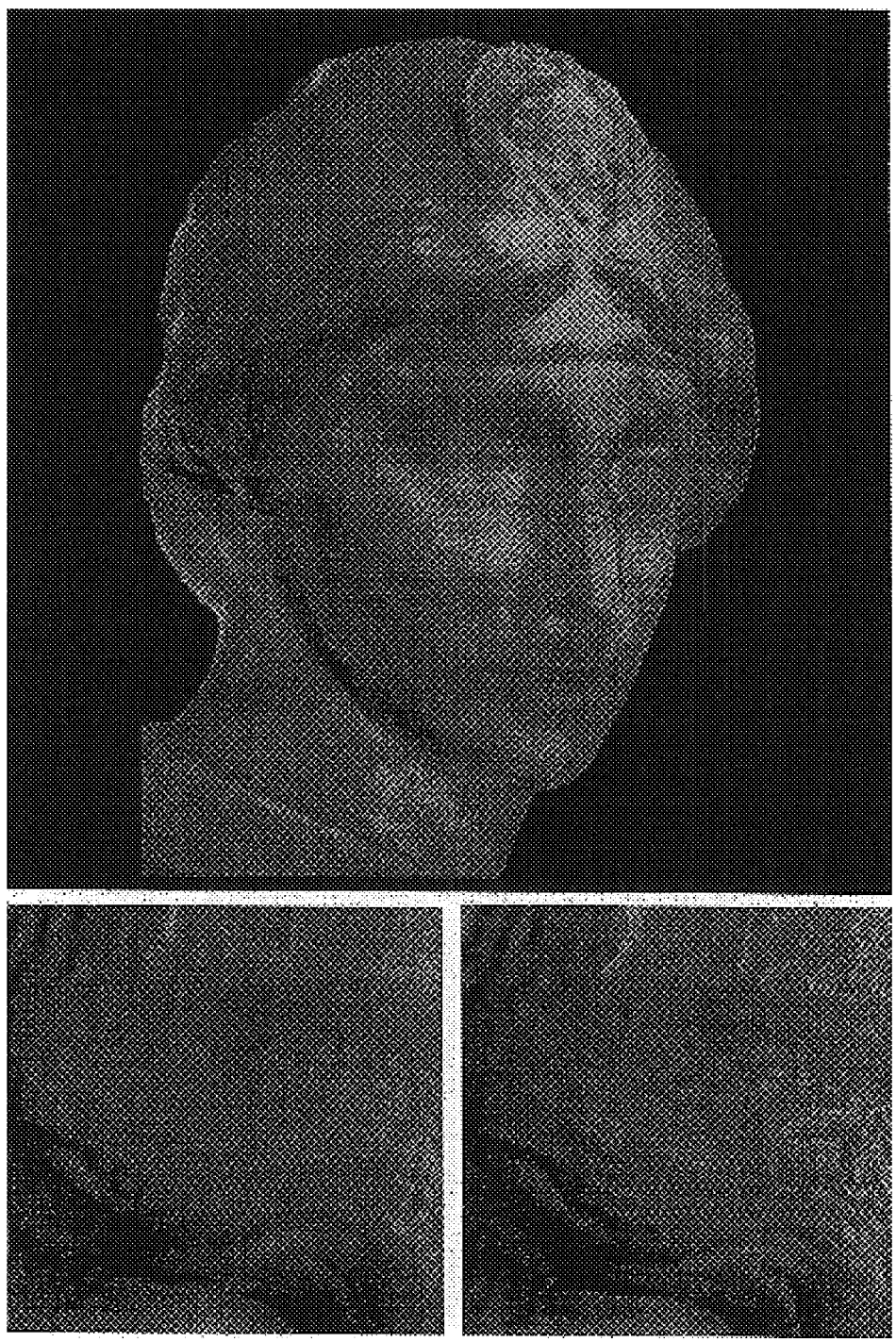
FIG. 2 is an example of the visual quality of textures for a model of a statue, obtained from multiple overlapping scans, that are enhanced with image-based fine-registration and weighted averaging techniques in accordance with the teachings herein.

FIG. 2 is an example of the visual quality of textures for a model of a statue, obtained from multiple overlapping scans, that are enhanced with image-based fine-registration and weighted averaging techniques in accordance with the teachings herein. The top image shows the final texture reconstructed from 20 overlapping scans. The two smaller images illustrate a detail from a highly carved area of the hair before (left) and after (right) image-based registration. The fine chisel marks become clearly visible after the registration.

Figure 1:
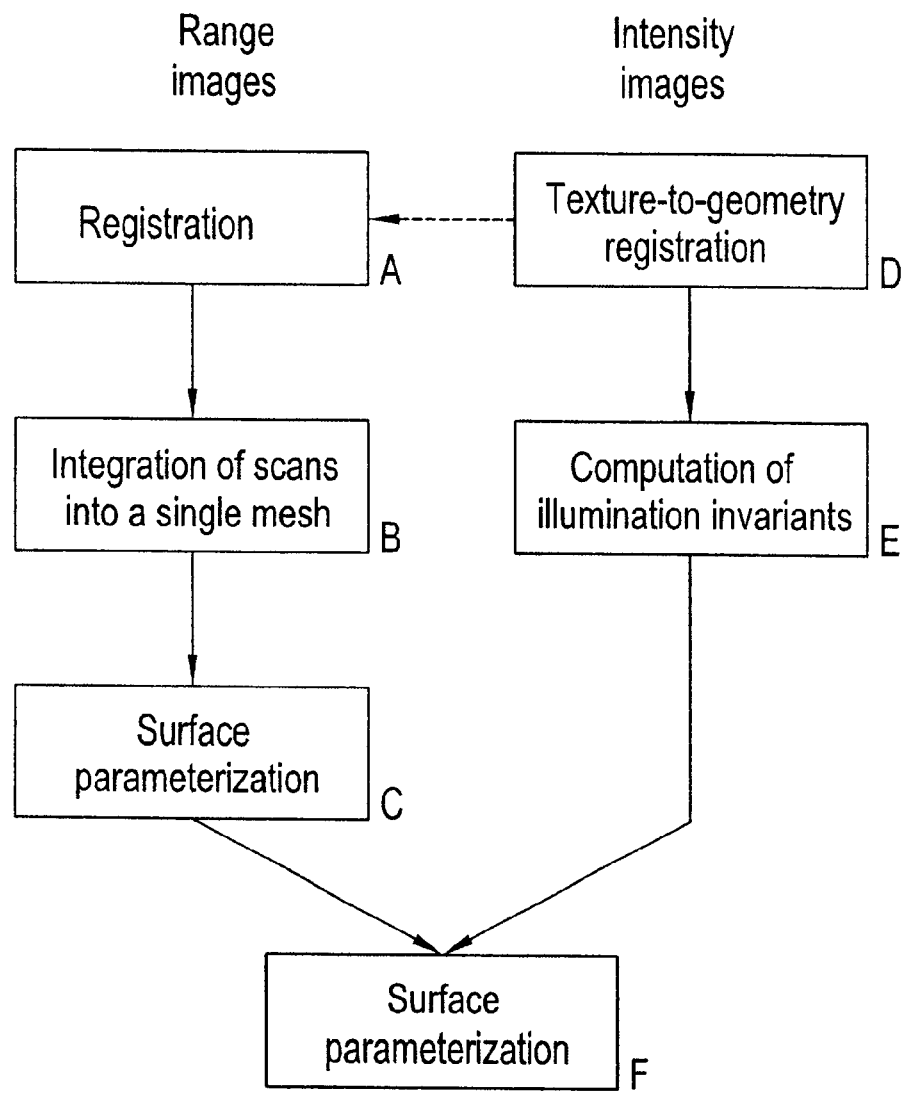
FIG. 1 is flow diagram depicting the basic operations necessary to create a digital model from a series of captured images.

A description is now provided of presently preferred methods to realize the steps shown in FIG. 1. The goal is to produce a model of high visual quality, rather than to acquire a dense geometric representation. In accordance with these teachings novel techniques are disclosed for the registration and reconstruction steps, respectively.

Beginning with scan acquisition and processing, a scanning system is used in which range and intensity images are obtained simultaneously and are registered via a priori calibration. The presently preferred scanner is a hybrid multi-view/photometric system built around the Visual Interface Virtuoso. Range images are captured by a multi-camera stereo system which projects a striped pattern onto the target object. The system produces range images that are converted to individual triangle meshes (scans) with an approximate intersample distance of 2 mm and submillimeter depth accuracy.

Intensity images are recorded under five calibrated lighting conditions (see light sources 112a in FIG. 11C) and have a much higher resolution than the projected light geometric scans (between about 0.25 mm and 0.5 mm intersample distance, depending on surface orientation.)

The intensity images are processed to extract RGB albedo, normal, and weight (confidence) maps for each scan.

This photometric processing involves using the approximate knowledge of the underlying geometry to account for imperfections in the measuring system, as well as global compensation of variations in camera response.

The images that contain the RGB albedo and normals are referred to generically as "texture maps". Holes may occur in these textures where photometric processing fails due to fewer than three light sources being visible at a point. In such regions, the textures are filled using the normals of the underlying mesh and data from just one or two of the associated intensity images.

A "weight map" encodes a degree of confidence in the data at each pixel of a texture map. The weight is proportional to the ratio of the projected surface area to the true area of the surface represented by the pixel. This ratio is computed based on the distance from the corresponding point on the surface to the camera $112b$ center and the scalar product between the surface normal and the view direction. The weight is higher at pixels computed from the photometric data rather than based on underlying geometry. In addition, the weight of a pixel decreases as the distance to the scan boundary becomes smaller.

The boundaries between photometric values and underlying values are preferably smooth, as are the corresponding weights, so that abrupt changes in the final texture are not visible.

The acquisition of intensity images aligned with the corresponding range images and the photometric processing correspond to steps D and E in FIG. 1.

Next, the scan registration step A is initiated with a pairwise manual alignment to estimate the position of each scan with respect to a global coordinate system. This step is performed at the same time as the removal of outliers in the range data.

Then, the initial manual registration is refined using a variation of the multiview ICP algorithm. The presently preferred variation of the multiview ICP algorithm uses geometric information only.

It is desired to produce high-quality texture maps by combining information from multiple overlapping scans at each pixel. To achieve this, a highly accurate alignment is required to prevent the appearance of ghosting and blurring artifacts. This is accomplished, in accordance with an aspect of this invention, by avoiding the mixing of position and color data by performing an image-based alignment after the geometry-based registration has converged.

In a manner similar to a known approach (E. Gagnon, J.-F. Rivest, M. Greenspan, and N. Burtnyk, "A computer-assisted range image registration system for nuclear waste cleanup", IEEE Transactions of Instrumentations and Measurement, 48)3):758–762, 1999), image matching is used to refine the alignment. However, the presently preferred embodiment differs in a number of critical ways from known approaches. First, since this is a refinement step, the inventive method compares images that are reprojected onto the same camera view to account for geometric distortions. Second, instead of manually selecting three points to be matched, the inventive method implements an automatic selection procedure that identifies samples in areas with significant image structure. Finally, images are employed that are consistent with each other by processing them according to methods described in H. Rushmeier and E. Bernardini (two of the instant inventors), "Computing consistent normals and colors from photometric data", In Proc. of the Second Intl. Conf. on 3-D Digital Imaging and Modeling", pages 99–108, Ottawa, Canada, October 1999.

FIG. 3 provides a pictorial representation of the presently preferred image-based registration algorithm, which takes advantage of the high-resolution information in the images to refine the geometric alignment obtained by ICP.

A basic idea is to use "detail maps" computed from the texture maps to generate highly-accurate pairs of corresponding points on the scans by matching their image neighborhoods. The generated pairs are subsequently used to compute rigid transformations that lead to an improved alignment of the geometry.

The scans are considered for alignment one at a time, in random order, while the others may remain fixed. Given a scan to be aligned, sample points are selected automatically on its detail map in regions where interesting- features are present. The detail maps corresponding to all overlapping scans are then projected onto the current image plane and a search is performed in the neighborhood of each sample point for a best match in the overlapping areas of the projected maps. The resulting pairs of image point samples are back-projected onto their corresponding geometry and used to compute a rigid transformation that minimizes the sum of squared distances between corresponding points. The transformation thus obtained is applied to the moving scan, and the process is repeated until a convergence criterion is satisfied.

A more detailed description of the image-based registration algorithm is given below. The image-based registration completes step A in the image processing pipeline.

Turning now to surface reconstruction and parameterization, having obtained a tightly aligned set of scans, the method proceeds to integrate them into a seamless triangle mesh (step B.) A presently preferred technique is known as Ball Pivoting, which efficiently generates a triangle mesh by interpolating an unorganized set of points (see also FIGS. 11E and 11F).

Next, the method determines a suitable surface parameterization (step C) to allow for an efficient computation of texture maps that cover the entire object without overlapping. Since it is desired to use mip-mapping techniques, the surface is partitioned into "height-field patches", rather than parameterizing it one triangle at a time. A mip-map (multum in parvo) is an image which uses three quarters of its pixels to store a texture, and the remaining one quarter to store a filtered and reduced version of the same texture.

The texture-reconstruction technique uses all of the acquired data at each point, as opposed to stitching together pieces of the initial scans. Hence, the initial scans are not used as height-field patches. Instead, a new partition of the geometry is computed by a greedy approach that begins with a seed triangle and grows the surface region around it until a maximum patch size or maximum slope deviation is reached. Each patch is then projected in the direction which maximizes its total projected area, providing a simple local parameterization.

Since the reconstruction technique employs projecting textures corresponding to the original camera positions, conventional types of surface parameterizations that do not maintain visibility and metric information are not particularly well suited to this approach.

With regard to texture reconstruction, and once the model is partitioned into height-field patches, albedo and normal maps are reconstructed for each patch by combining the information in all overlapping textures (step F). For each pixel of a texture to be computed, all textures that have information about its albedo and normal are identified. Corresponding values are combined using a weighting scheme that takes into account the confidence in each value, while avoiding the creation of discontinuities at patch-to-patch and scan-to-scan transitions (see also FIG. 8). Occlusions are also be handled correctly.

Turning now to image-based registration, a goal of image-based registration technique is to improve the geometry-based alignment of scans that make up a 3D object. This is accomplished by taking into account additional information contained in the high-resolution detail maps computed for each scan.

Detail maps are generated from albedo and normals maps. Depending on the application, they may be RGB images, grey-scale images, or geometry-invariant representations of the normals.

The image-based registration algorithm makes use of image matching to identify pairs of corresponding points on the high-resolution detail maps. Subsequently, these pairs are back-projected onto the scans and used to derive a rigid transformation that minimizes the distance between corresponding points in a least-squares sense.

Figure 3A:
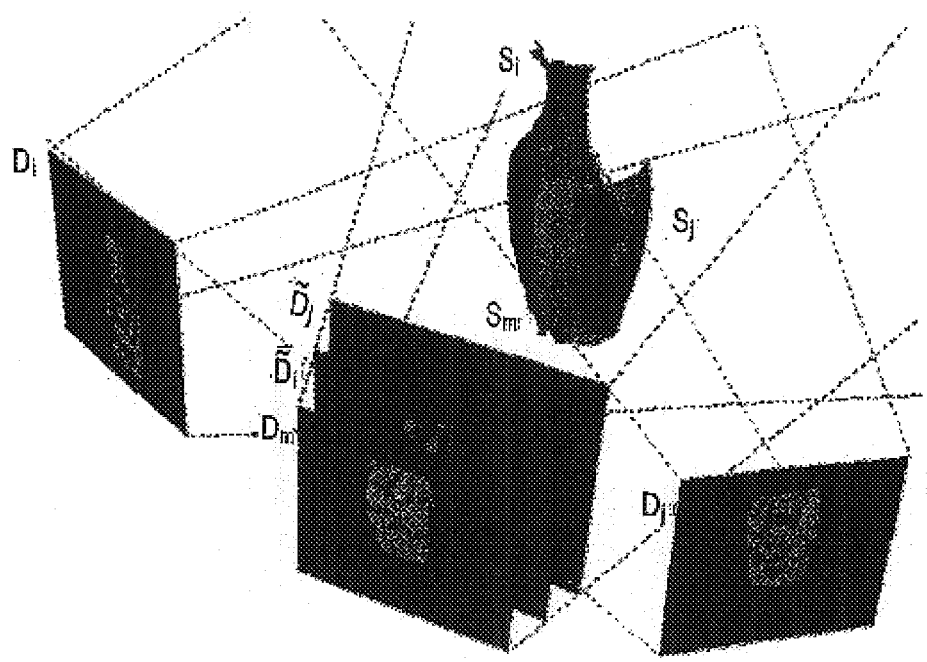
FIG. 3, shown as FIGS. 3A, 3B and 3C, provides a pictorial representation of the presently preferred image-based registration algorithm.
Figure 3C:
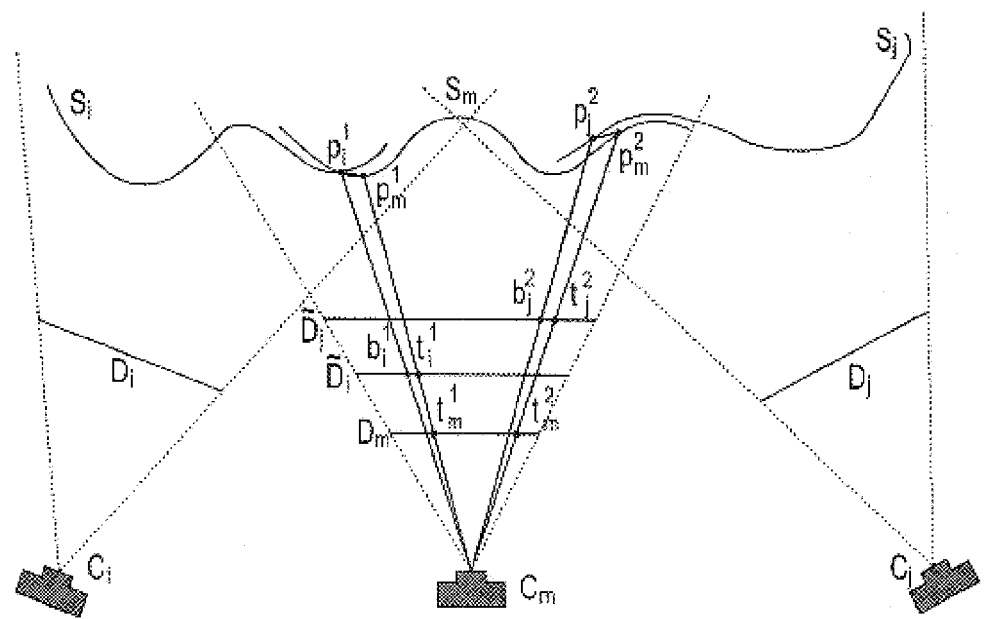
Figure 3B:
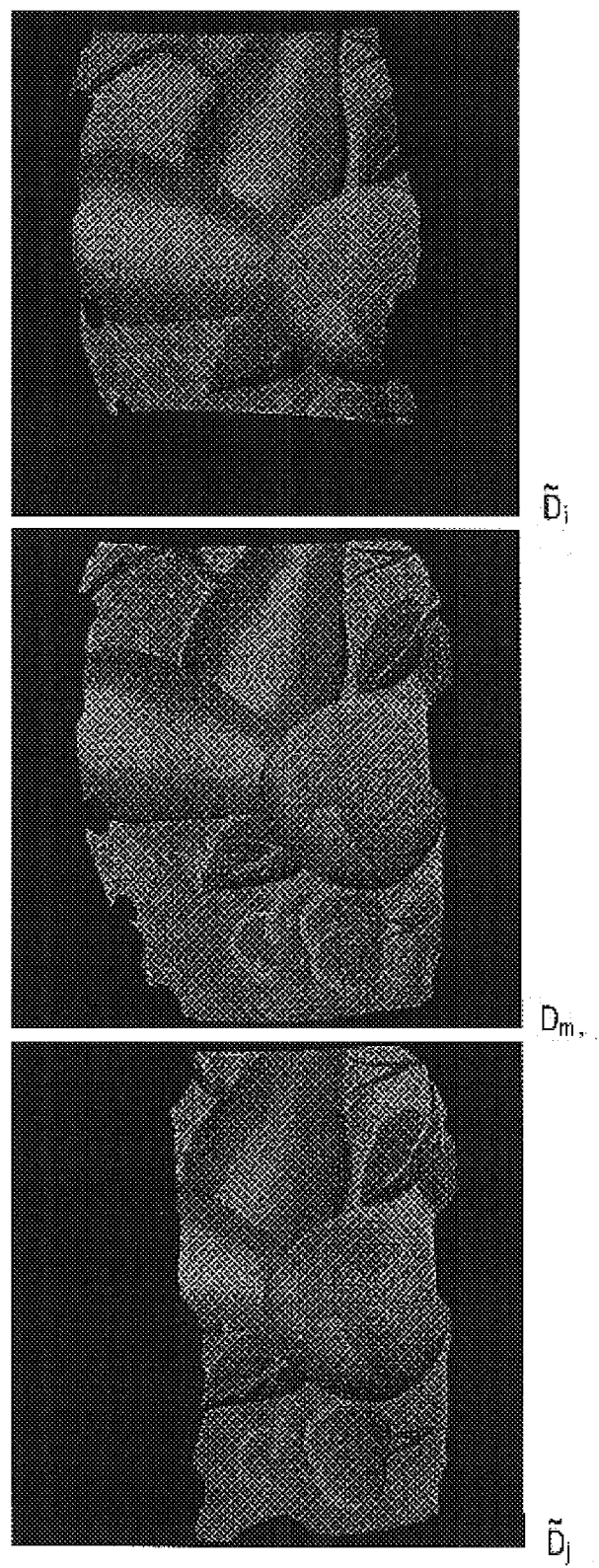

FIGS. 3A, 3B and 3C illustrate the method using a simple example with three scans Si, Sj, and Sm, with their respective detail maps, Di, Dj, and Dm, and cameras Ci, Cj, and Cm. For the purposes of this example, Si and Sj are fixed, while Sm is being moved to achieve better alignment with respect to Si and Sj. The detail maps Di, Dj are rendered onto the image plane of camera Cm, generating projected detail maps {Di} and {Dj}, respectively. Hereinafter D tilde will be represented in the description by the notation: {D}. Ideally, in the absence of noise and errors in the initial alignment, the images Dm, {Di} and {Dj} would be identical in the areas of overlap. A sample point selected in such an area in one image would identify precisely the same feature in all overlapping images. In practice, corresponding features may appear shifted due to misalignment. Let $t_m^1$ be a sample point on Dm with pixel coordinates (u,v) that are inside the overlap region of Dm with {Di}, and let $t_i^1$ be the point on {Di} with the same coordinates: $t_i^1$=(u,v). A correlation-based search is conducted in a neighborhood of $t_i^1$ to identify a point $b_i^1$ for which the image area around it best matches the area around $t_m^1$. The points $t_m^1$ and $b_i^1$ are back-projected onto $p_m^1$e Sm and $p_i^1$e Si, respectively, and the pair ($P_m^1$, $P_i^1$) is saved. The process is repeated for other sample points on Dm where there is overlap with either {Di} or {Dj}. Finally, after all samples are processed, the pairs ($p_m^k$, $p_h^k$=i,j) are used to compute a rigid transformation that improves the position of scan Sm with respect to Si and Sj in the least-squares sense.

More particularly, FIGS. 3A, 3B and 3C present examples of a two-dimensional diagram of the image-based registration algorithm in accordance with this invention. Three scans are involved: scan Sm, with corresponding detail map Dm, is registered to the two overlapping scans Si and Sj. Detail maps Di and Dj are mapped onto their respective geometry and rendered onto the image plane of camera Cm, generating reprojected images {Di} and {Dj} (the three images Dm, {Di} and {Dj} are shown cropped in FIG. 3B, and {D1} and {Dj} are drawn with a small amount of offset in FIG. 3C for illustrative purposes). In the ideal case of perfect scans and no registration error, these images would be pixel-by-pixel the same as Dm in the areas of overlap. Assuming some registration error, consider a set of sample points on detail map Dm, distributed in areas where interesting image features are present. Starting with a sample point $t_m^1$ on Dm, corresponding to geometric point $p_m^1$ on Sm, the method searches in the neighborhood of the corresponding point $t_i^1$ on {Di} for a point $b_i^1$ that maximizes image correlation. The point $b_i^1$ is then back-projected onto the scan Si into $p_i^1$. The process is repeated to generate a set of pairs of corresponding points ($p_m^k$, $p_h^k$). A rigid transformation is computed that minimizes the sum of squared distances between corresponding points.

Figure 12A:
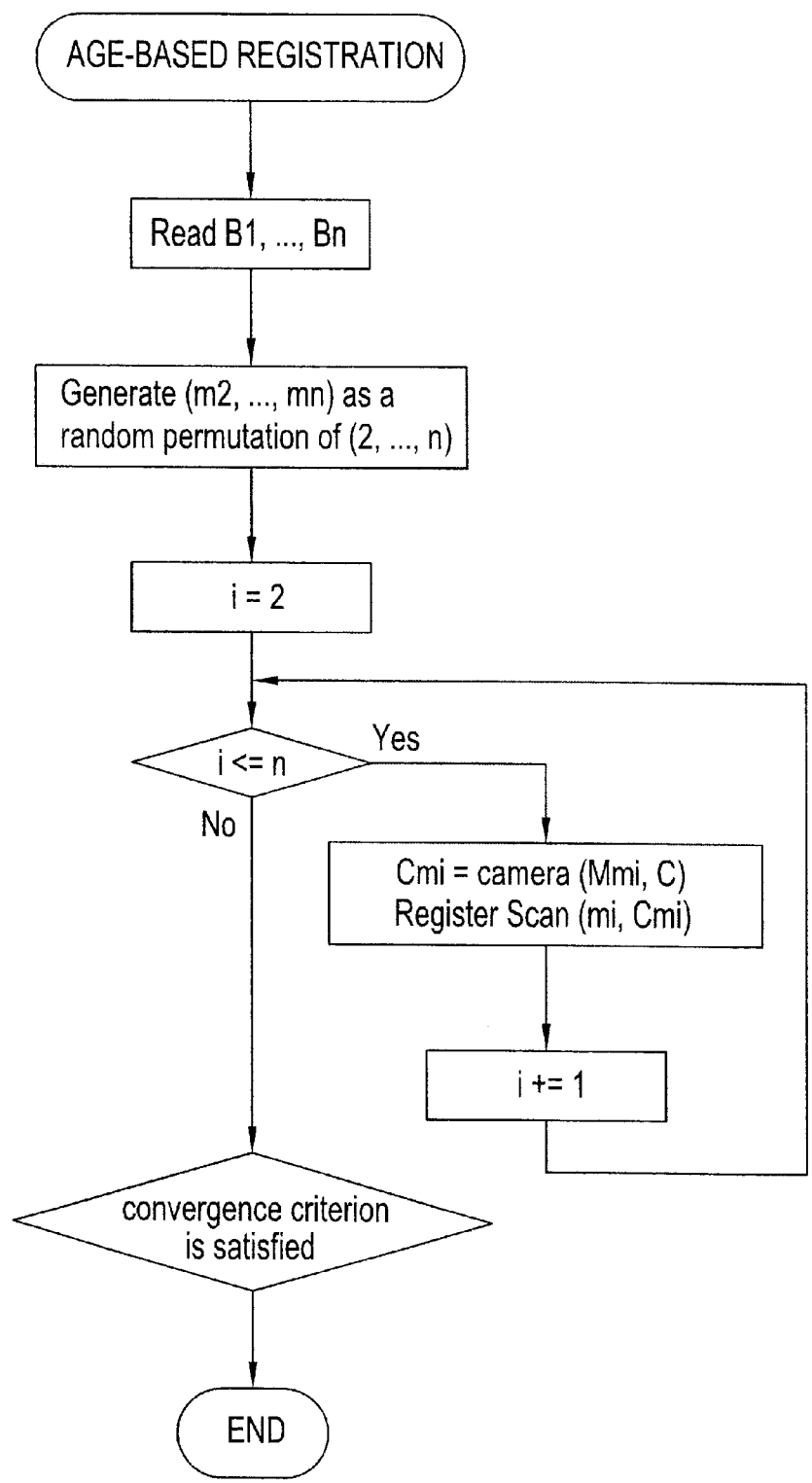
Figure 12B:
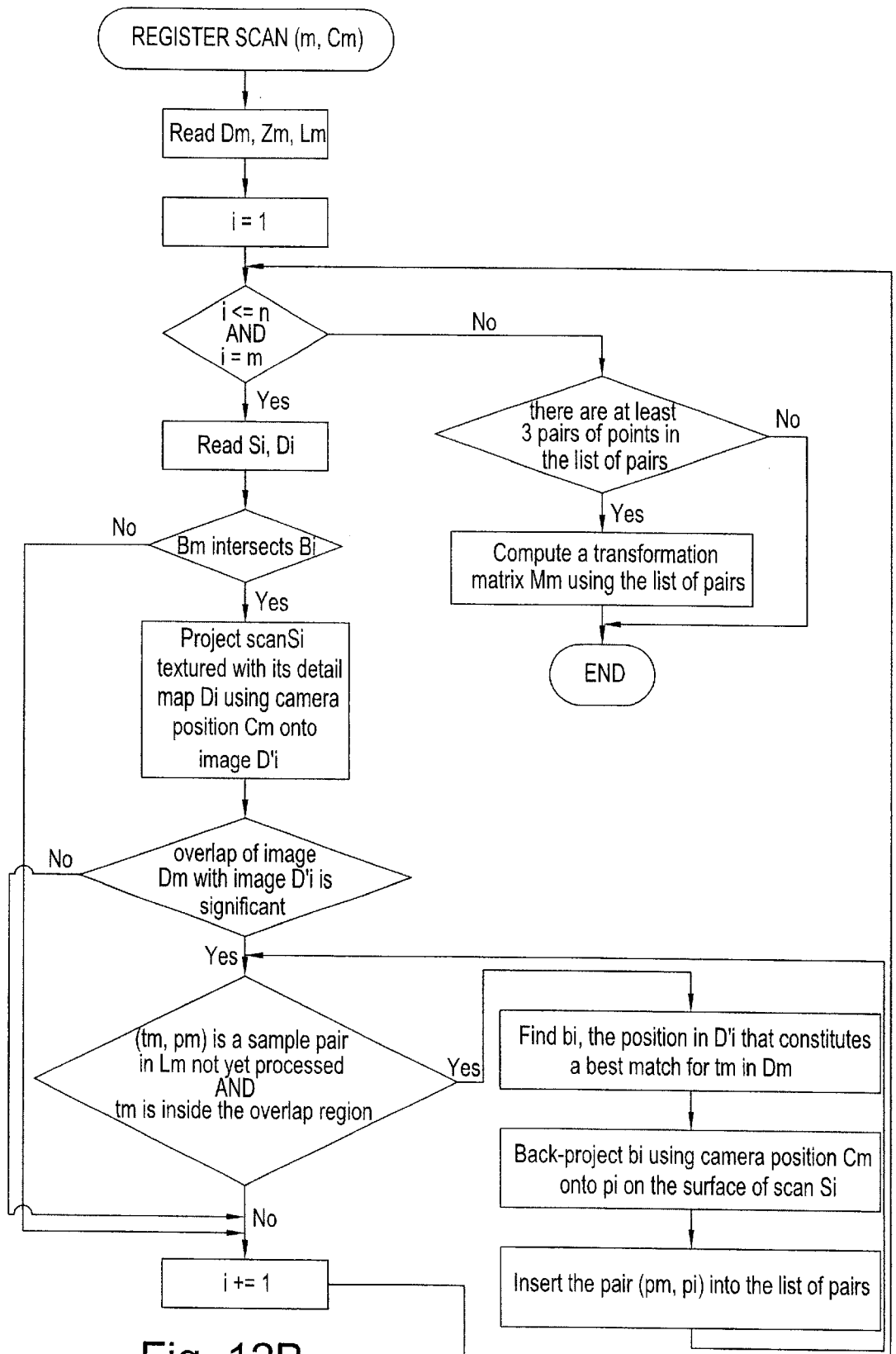
FIG. 12B is a logic flow diagram of the register scan(m) procedure of FIG. 12A.

The image-based registration algorithm is further described in pseudocode in FIG. 4, and is depicted in even greater detail in the logic flow diagrams of FIGS. 12A and 12B. The input data contains the scans to be registered with their initial registration matrices, as well as their corresponding detail maps, depth maps, bounding boxes, and lists of sample points. In addition, the calibration parameters of the intensity-capture camera are considered to be known. These parameters include the position and orientation of the camera in the local frame of each scan, its field-of-view angle, and the pixel size of the output image. Knowledge of these parameters enables one to define a camera that matches the view of the capture camera. With the exception of the bounding boxes which are stored in memory for the entire duration of the alignment, all other data is preferably loaded on demand. The output is a set of registration matrices (one per scan) that defines the new, more accurate alignment. The main steps of the algorithm will now be described.

Selection of Sample Points

Prior to the actual alignment, a list of sample points Lm is computed for each scan Sm. Image-processing techniques are used to identify points $t_m^k$, k=1, . . . . , $n_m$ in the detail map Dm. The goal is to select points in areas of rich content that pertain to matching by cross-correlation, rather than to identify precise image features. In addition, for each $t_m^k$ there is also computed the corresponding point $p_m^k$e Sm under the perspective projection defined by camera Cm.

A variety of techniques, including selection based on moment invariants and several edge-detection methods, could be employed. For the cases presented herein, an edge-detection technique is used which is illustrated in FIGS. 5A and 5B.

Figures 5A, 5B:
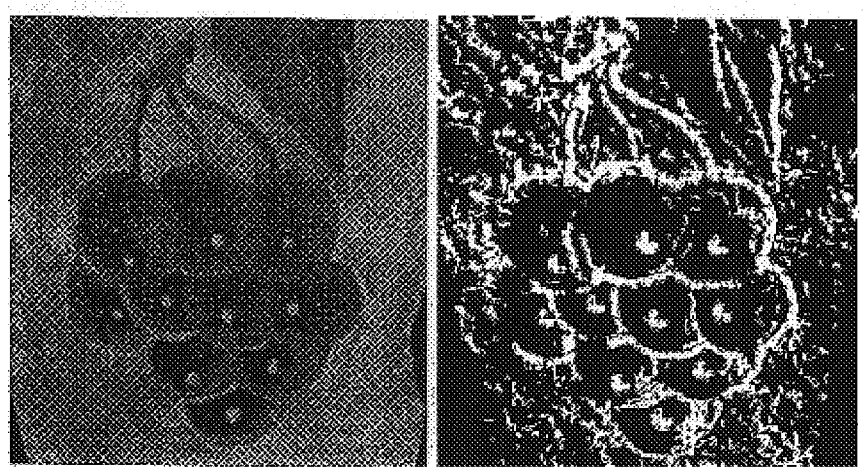
FIGS. 5A and 5B depict a sample point selection technique based on an edge-detection technique.

FIG. 5A shows a portion of the original detail image. First, the detail image is slightly blurred using a Gaussian filter to reduce the noise. Next, horizontal and vertical Sobel operators are applied separately to the blurred image. The two resulting edge images are combined into one that contains at each pixel the largest of the corresponding values at that pixel. A thresholding operation is applied next to filter out regions with low gradient variation. The threshold value is selected automatically, based on the image histogram. The result is a bitmap that contains values of one where the gradient variation is above the threshold and zero elsewhere. This bitmap is used to select sample points in regions where edges have been identified. Before selecting the points, all pixel values are set to zero where the corresponding weights in the weight map are below a given confidence threshold, since it is undesirable to include samples in these areas. For the actual selection, a regular grid is superimposed onto the bitmap to ensure that selected points are distributed over the entire image. The first non-zero pixel encountered in each grid cell in row-wise order is selected as the sample point corresponding to that cell (FIG. 5B) and is inserted into the list of samples. During alignment, points in the list are preferably considered in random order to ensure that all meaningful regions of the image contribute to the registration process.

Protection of Detail Maps

For the alignment of a given scan Sm (see the procedure register_scan in FIG. 4), the pairs of points to be matched are selected based on corresponding points in the detail map Dm and the detail maps of overlapping scans. To compare two detail maps Dm and Di, they need to be rendered from the same camera position, i.e., Dm is compared to {Di}, the projection of Di onto the image plane of the camera Cm (see FIG. 3).

A most straightforward way to perform such projections is to render scan Si with the detail image Di as its texture, using camera Cm. However, this approach produces incorrect results in the presence of scan self-occlusions or occlusions from other scans.

Figure 6:
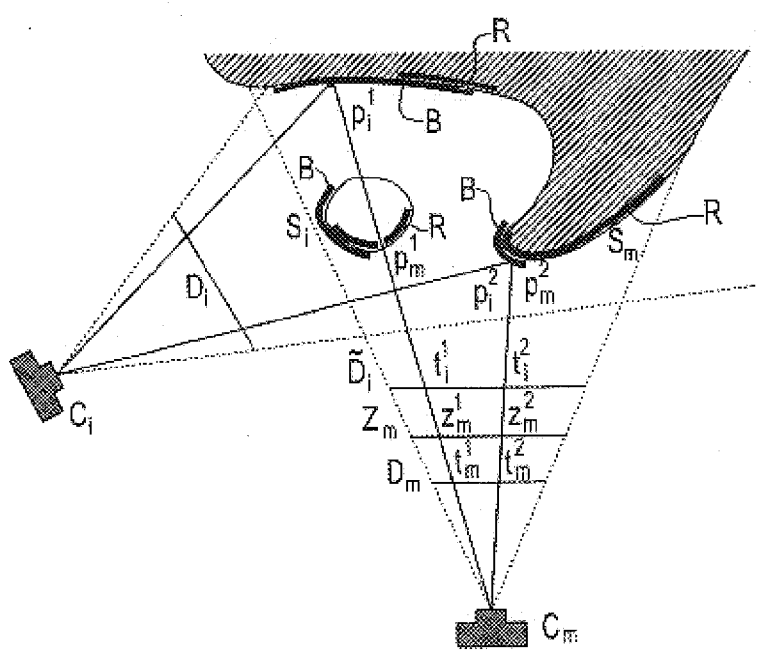
FIG. 6 illustrates two contrasting occlusion situations.

To avoid this problem, a depth map Zm is preferably stored with each scan. This can be simply a binary dump of a z-buffer 110e (see FIG. 11B) created by rendering Sm using its own camera Cm. Before rendering Si with Di as its texture from camera position Cm, the z-buffer 110e is preloaded with the depth map Zm. A small offset e is added to prevent z-buffer contention and to account for alignment errors between Sm and Si. The occluded parts of Si are now correctly discarded, and the corresponding regions in the projected detail map {Di} receive no texture. FIG. 6 shows two contrasting occlusion situations: point $p_i^1$ is occluded by $p_m^1$ and thus the corresponding pixel $t_i^1 e$ {Di} remains black, whereas point $p_i^2$ is visible from Cm and thus $t_i^2$ receives texture values from Di.

More specifically, FIG. 6 depicts an occlusions example wherein point $p_i^1$ is visible from camera position Ci, but not from Cm. Since the detail map Di is projected onto the image plane of Dm, this point is discarded. The depth map Zm corresponding to scan Sm is used to mask points of Si which are not visible from Cm. In contrast, point $p_i^2$ is visible from Cm and its texture is recorded onto {Di}. The curves A and B identify the two scans Sm and Si, respectively. The areas of {Di} that receive texture from scan Si are also highlighted as curves B.

Identification of Matching Pairs

With regard now to the identification of matching pairs, given a pair of detail maps Dm and {Di}, both rendered from the same camera position Cm, the algorithm first computes an overlap bitmap Omi. A pixel in this bitmap is set to one if and only if both Dm and {D} i have a weight at that pixel that is larger than the confidence threshold. If there is sufficient overlap, the sample points (tm, pm) e Lm for which tm is inside the overlap region are processed one-by-one, until a prespecified number of matching pairs is found or until all points have been processed.

For a given sample (tm, pm) such that tm e Dm has pixel coordinates (u, v), define a point ti e {D} i with the same coordinates. Ideally, tm and ti mark the same image feature on Dm and {D} i, i.e., scans Sm and Si are perfectly aligned. In practice, ti may be slightly offset with respect to the feature marked by tm due to errors in the alignment of the scans.

Figures 7, 7A:
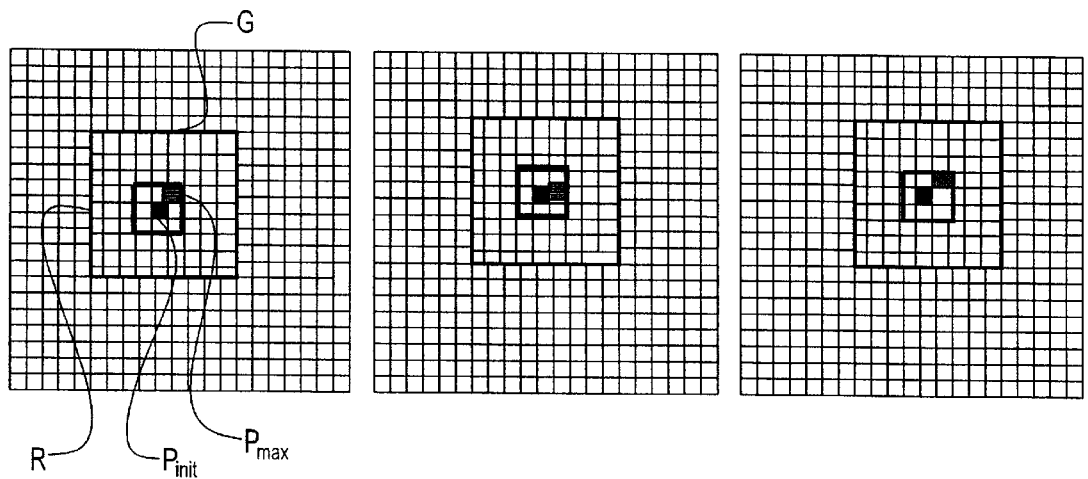
FIG. 7 illustrates an example of a presently preferred sliding-window cross-correlation approach for a point that maximizes cross-correlation between image neighborhoods.
FIG. 7A shows equations used in the computation of a correlation coefficient of n data points.

The preferred strategy is to search in the neighborhood of ti for another point bi that is a better match for tm, and to use the corresponding point pi=back_projection(bi, Si, Cm) e Si as the match of pm in the final alignment. Referring to FIG. 7, the search for bi is preferably performed using a sliding-window cross-correlation approach.

More particularly, FIG. 7 depicts a sliding-window search for the point maximizing cross-correlation between image neighborhoods. The search starts at point ti e {Di}, designated as Pinit. The area G is cross-correlated to the corresponding area in Dm. The operation is repeated for areas centered in all pixels within the search region designated R. The pixel corresponding to the center of the maximum cross-correlation area is designated as Pmax. The search window is moved to the new center and a new iteration then starts.

The radius of the search region for the cross-correlation and the size of the correlation window are defined taking into account the resolution of the scanning system and the maximum registration error after the geometry-based alignment. In the instant case, given a linear intersample distance of the scanner of approximately 2 mm, and a residual error after the geometry-based alignment of less than 4 mm, one may define a conservative radius of 7 mm (i.e., 14 pixels, assuming a 0.5 mm resolution in the detail maps) for the search area around each point ti. A cross-correlation is performed in this area using a window of 15 mm radius (i.e., 30 pixels), also a fairly conservative choice to ensure that significant features around each point are included.

The location within the search area that yields the highest value for the correlation coefficient defines the best match position bi. Only pairs for which the correlation value is above a certain threshold are used to refine the alignment. The method then computes the correlation coefficient of n data points ($tm^k$, $ti^k$) according to Pearson's formula, $p^2 = s^2 mi/s_{mm}s_{ii}$, using the equations shown in FIG. 7A.

Cross-correlation is known to be a time-consuming procedure. For efficiency, it is preferred to replace an exhaustive search in a 14-pixel radius area with a sliding window approach that is faster to compute. It is also preferred to restrict the radius of the search area to 3 pixels, and to allow it to slide in the direction of the best correlation for a predefined number of times. One potential problem with this approach is that the search may terminate by finding a local maximum of the correlation function, and thus the global maximum is never reached. It is preferred to compensate for this potential problem by identifying a larger number of points than are actually needed. An alternative solution is to allow the search window to slide out of a local maximum with a given probability dependent on the surrounding values.

Multiple Iterations and Convergence

The image-based registration method preferably performs multiple iterations to allow each scan to adjust its position with respect t its neighbors. The number of iterations is typically determined by some convergence criterion. In experiments, a measure of convergence that was used was the change in the mean square error between consecutive iterations. If this change is small, the algorithm stops.

During alignment, one of the scans (e.g., the first in the input list) is considered the reference scan and remains always fixed. At each iteration, the other scans are considered for alignment one-by-one, in random order. Culling is used to speed up the procedure by considering only scans with intersecting bounding boxes. The scan currently being aligned moves in search for a better position with respect to all other scans, which are considered temporarily fixed.

Image-based registration as described herein has several advantages. It takes into account high-resolution information in the captured images to fine-tune the geometric alignment of scans. The fine-tuning is performed via image matching involving a simple and efficient cross-correlation procedure that is restricted to small areas around selected sample points. In addition, any image processing technique that allows for finding feature-rich regions in the input images is well-suited for the selection of the sample points. The sampling method presented is completely automatic and requires no manual intervention. Occlusions are handled simply and efficiently by comparing depth values stored in precomputed depth buffers.

Figure 13:
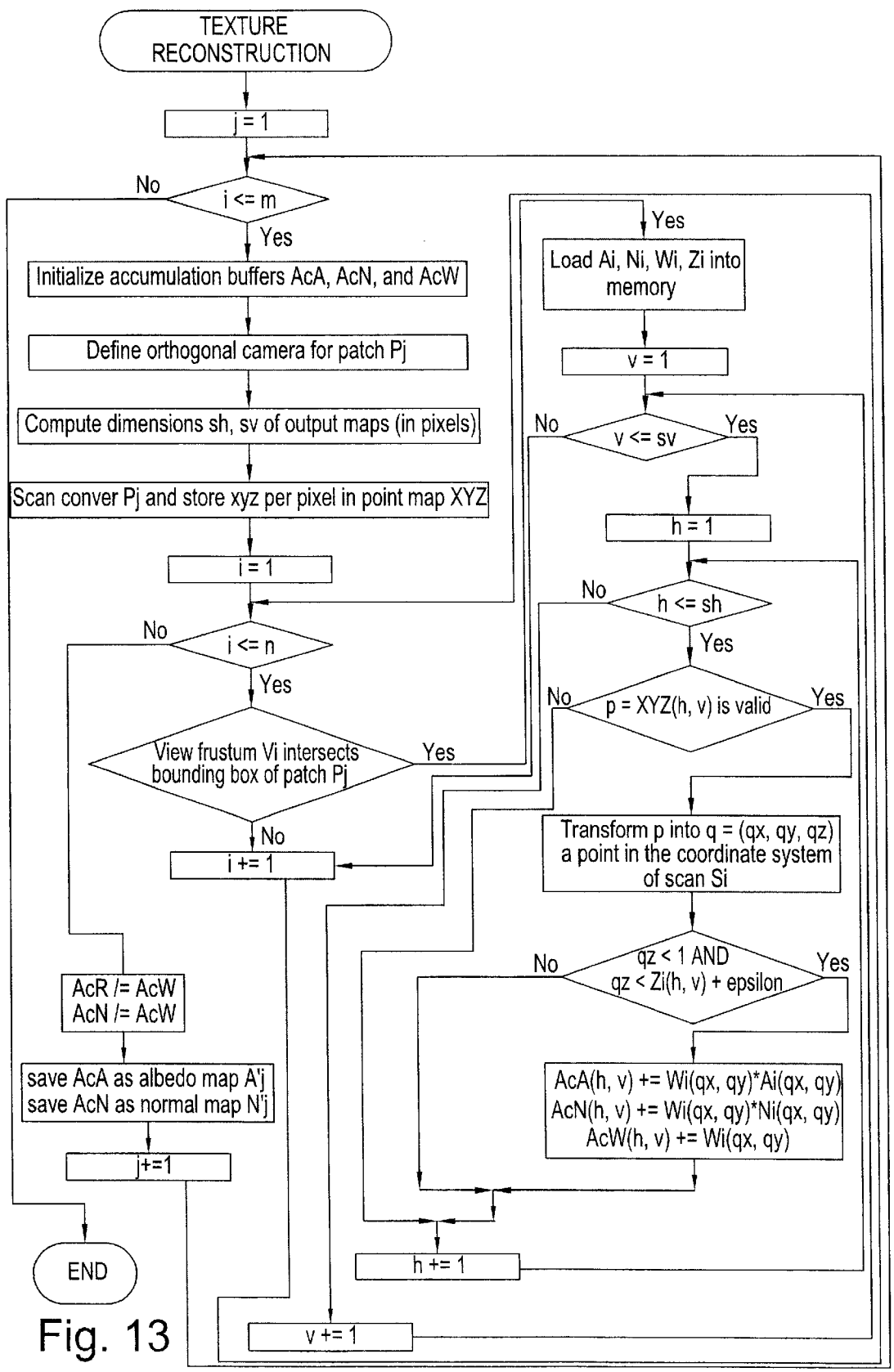
FIG. 13 is a logic flow diagram of a presently preferred texture reconstruction method.

A description is now provided of a presently preferred texture reconstruction technique. Reference can also be had to the logic flow diagram of FIG. 13.

A goal of texture reconstruction is to generate seamless texture maps covering the model. A seamless texture map is ideally one that combines data from multiple scans, and that does not exhibit visually distinct delineations between portions of the surface corresponding to different scans. To make maximum use of the acquired data, texture maps are recalculated based on the integrated mesh. For a given scan, albedo and normal data may be obtained in regions where there is no geometry available from that scan. This additional information can be used to fill in holes in data corresponding to other scans.

The input to the texture reconstruction process contains a collection of height-field patches that form a partition of the model surface, and the finely registered scans with the recomputed albedo, normal, and weight maps. A mapping between geometry and corresponding textures is defined as an orthogonal projection in the direction that maximizes the projected patch area, as shown in FIGS. 8A and 8B.

Figure 8A:
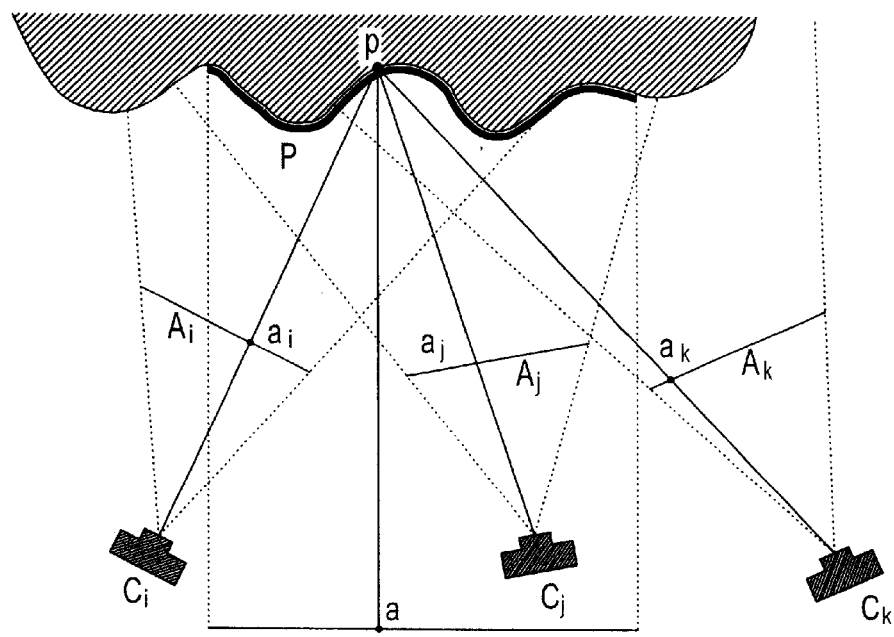
Figure 8B:
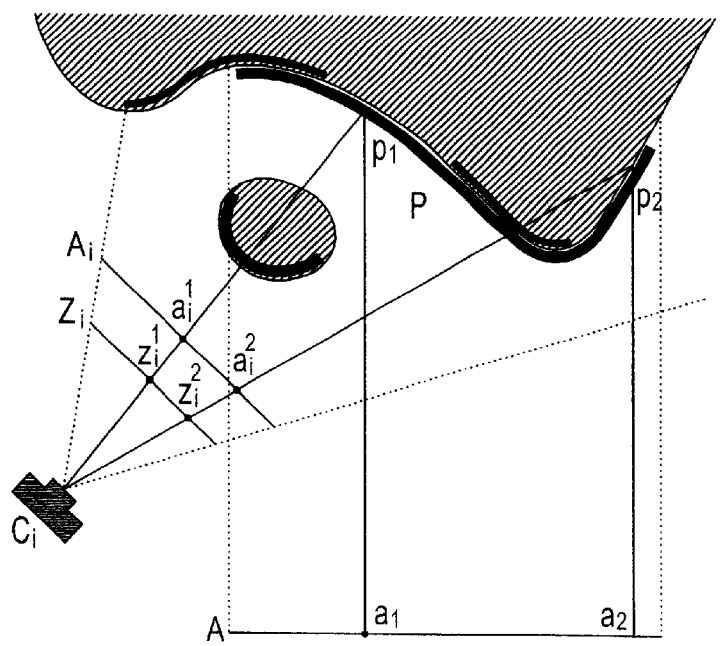
FIG. 8B shows an example of an occlusion.

Briefly, FIG. 8A shows a two-dimensional diagram of texture remapping. An albedo map A is computed for patch P. Three scans Si, Sj, and Sk have camera frusta intersecting patch P and are considered for the remapping. For each pixel a on texture A, consider the corresponding point p on patch P. This point projects onto points ai, aj and ak in the albedo maps of the three scans, and onto wi, wj and wk in the corresponding weight maps. The resulting value for a is given by the relationship $(w_i a_i + w_j a_j + w_k a_k)/(w_i + w_j + w_k)$. This particular weighting scheme beneficially avoids discontinuities at transitions between patches or between scans within the same patch. FIG. 8B is an example of an occlusion.

The pixel size of a texture is determined based on the projected size of the corresponding patch and on a user-specified parameter representing the desired number of pixels per unit of length.

All individual texture maps are combined using the weight maps described above. Because weights are generated per scan and not per patch, transitions across patch boundaries are not visible. Also, since the weights for each scan decrease with distance to the scan border, scan-to-scan boundaries are not visible.

The computation of a value for each texture pixel is illustrated in FIG. 8A. In this example, an albedo map A is computed for patch P. The three scans Si, Sj, and Sk have camera frusta that intersect the bounding box of patch P and are considered for the reconstruction.

A straightforward solution to the remapping problem is to use ray-casting. However, the time required to process all ray-mesh intersections makes this procedure prohibitively expensive. Another method to combine the albedo maps of the three scans into A is to define an orthogonal camera and to then render P multiple times, with each of the albedo and weight maps from the three scans as its texture. The rendered images are accumulated using weighted averaging. This approach is also inefficient and produces incorrect results in the presence of occlusions.

For example, consider the situation shown in FIG. 8B, where points p1 and p2 receive values from the maps associated with scan Si, even though they are occluded when rendered from camera position Ci. Similar to the method described above for image-based registration, depth values are used to filter out occluded points.

Specifically, to compute an albedo map A for a patch P, accumulation buffers for albedos, normals, and weights are created and initialized. P is then sampled at points corresponding to each pixel of A. This can be done by defining an orthogonal camera that matches the projection of P onto A, then scan-converting the primitives in patch P into a z-buffer.

It is preferred to use an inverse viewing transformation to convert each pixel (u,v) and the associated depth to world coordinates that are stored in a 'point map'. The processing of each overlapping scan is initiated by loading its albedo, normal, weight and depth map.

There is also defined a perspective camera matching the actual camera that was used to capture the intensity images. Considering each pixel of A, the method retrieves the corresponding patch point from the point map, and uses the viewing transformation to map the point into pixel coordinates (u, v) and its depth relative to the perspective camera. Next, the method compares the depth of the point with the value stored in the depth map Zi for the scan. If the depth is larger than the stored value (minus a small offset to account for numerical errors), then the point is occluded and therefore no longer considered. Otherwise, the method fetches the albedo, normal and weight values at location (u, v) in the corresponding maps, and updates the accumulation buffers. After all scans have been processed, the accumulated albedo and normal values are divided by the accumulated weight.

By pre-sampling the patch geometry and by fetching values from all maps simultaneously, the computations are streamlined. Occlusions are handled simply and efficiently by comparing depth values in precomputed depth buffers. Image and geometric information are loaded on demand, to allow processing of large sets of scans that do not fit in memory. The only information stored for all scans is the view-frustum of the capture camera and the bounding box of each patch in order to allow view frustum culling at the bounding box level.

Figure 9A:
FIGS. 9A–9C are representations of photographs, and are useful in gaining an understanding the statue model example employed in the description.
Figure 9B:
Figure 9C:

FIG. 9A represents a photograph showing a section of the statue in FIG. 1 in context, FIG. 9B shows a closeup view, while FIG. 9C shows 20 scans used to construct the head of the statue.

Figure 10E:
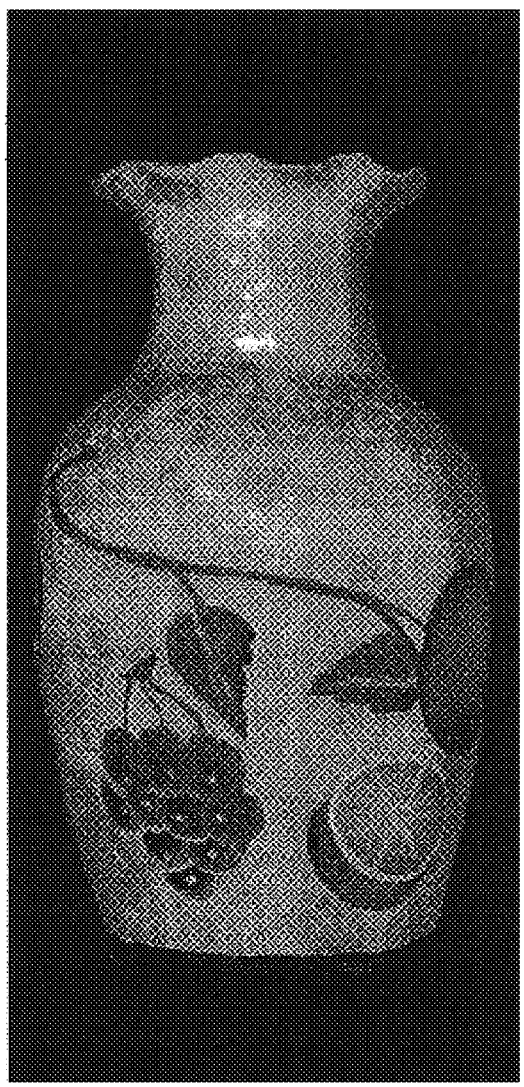

Briefly, FIGS. 10A–10E depict a vase dataset, where FIG. 10A shows an intensity image captured by the scanner, FIG. 10B illustrates a computed albedo map, FIG. 10C shows a reconstructed albedo without image-based registration (note the blurring due to misalignment), FIG. 10D shows the same view as 10C but with image-based registration, FIG. 10E illustrates an image of the full reconstructed vase, lit from the viewpoint.

Figure 10F:
FIGS. 10F–10I are examples of the statue data set.
Figure 10G:
Figure 10H:
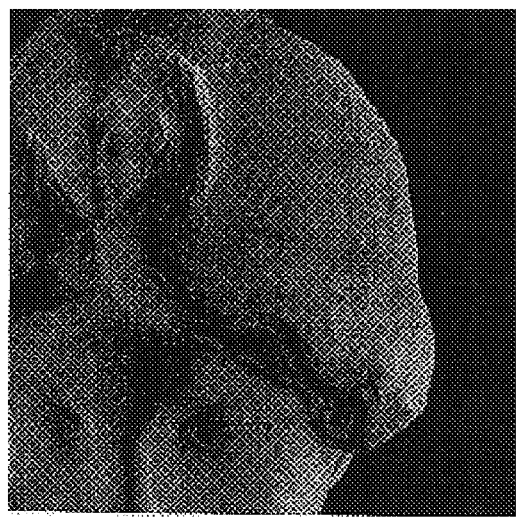
Figure 10I:
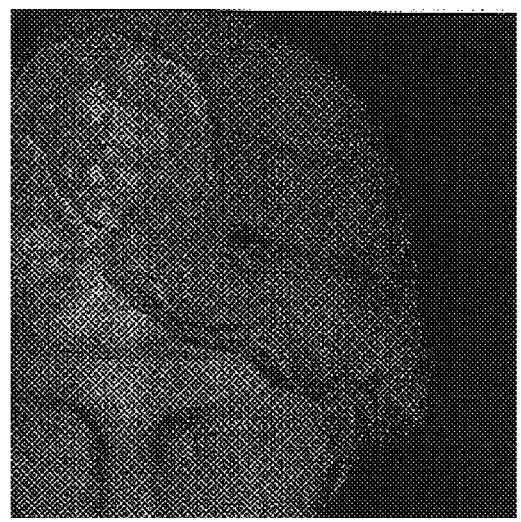

FIGS. 10F–10I depict the statue dataset, where FIGS. 10F and 10G are normal maps without and with image-based registration, respectively, while FIGS. 10H and 10I depict the statue under two different lighting conditions.

The foregoing description and examples have demonstrated the novel method with results for two qualitatively different test objects. One test object is a 26 cm tall vase, with few geometric features and sharp surface color variations. The other test object is a section of a large marble statue with subtle variations in both geometry and color.

For the vase, the major challenges are accurate alignment for an object with few geometric features, and the maintenance of sharp textures. The use of the image-based alignment improves the geometric alignment, and maintains sharpness. Twenty scans were acquired to cover the full vase. FIG. 10A shows a portion of one of the five captured intensity images for one of the scanner positions. The acquired image contains both specific illumination and some noise.

The albedo map obtained from the five calibrated images, mapped on the corresponding scanned geometry, is shown in FIG. 10B. The effects of illumination have been removed, but noise remains.

FIG. 10C shows the albedo maps reconstructed from multiple overlapping scans, using geometry-based registration only. The noise has been damped out by averaging, but the imperfect alignment causes ghosting artifacts. The same map after the image-based registration refinement is shown in FIG. 10D. On the 2 mm to 3 mm thick grapes stems the ghosting artifacts are far less apparent. The full reconstructed vase, lit from the viewpoint, is rendered in FIG. 10E.

For this test, the image-based registration required a total of 115 minutes on a data processor implemented with a 450 MHz Pentium™ II microprocessor, using 35MB of memory and six iterations. Texture reconstruction was completed in 30 minutes.

The views required to scan the section of statue were restricted by its setting shown in FIG. 9A. The 20 scans captured are shown in FIG. 9C. For the statue, the major challenge is obtaining sharp details in the normals maps that indicate small toolmarks in the geometry, as seen in the depiction of the black and white photograph in FIG. 9B. FIG. 10F and 10G show a comparison of the reconstructed normals maps before and after image-based registration. Illumination from a glancing angle accentuates the fine details on the head ornament. The details are clearer after the image-based registration. The reconstructed model can be relit using the detail normals and albedo. FIGS. 10H and 10I show the statue under two different lighting conditions. Image-based alignment of the 20 source scans completed in 148 minutes for six iterations, while texture reconstruction required an additional 35 minutes.

Figure 11A:
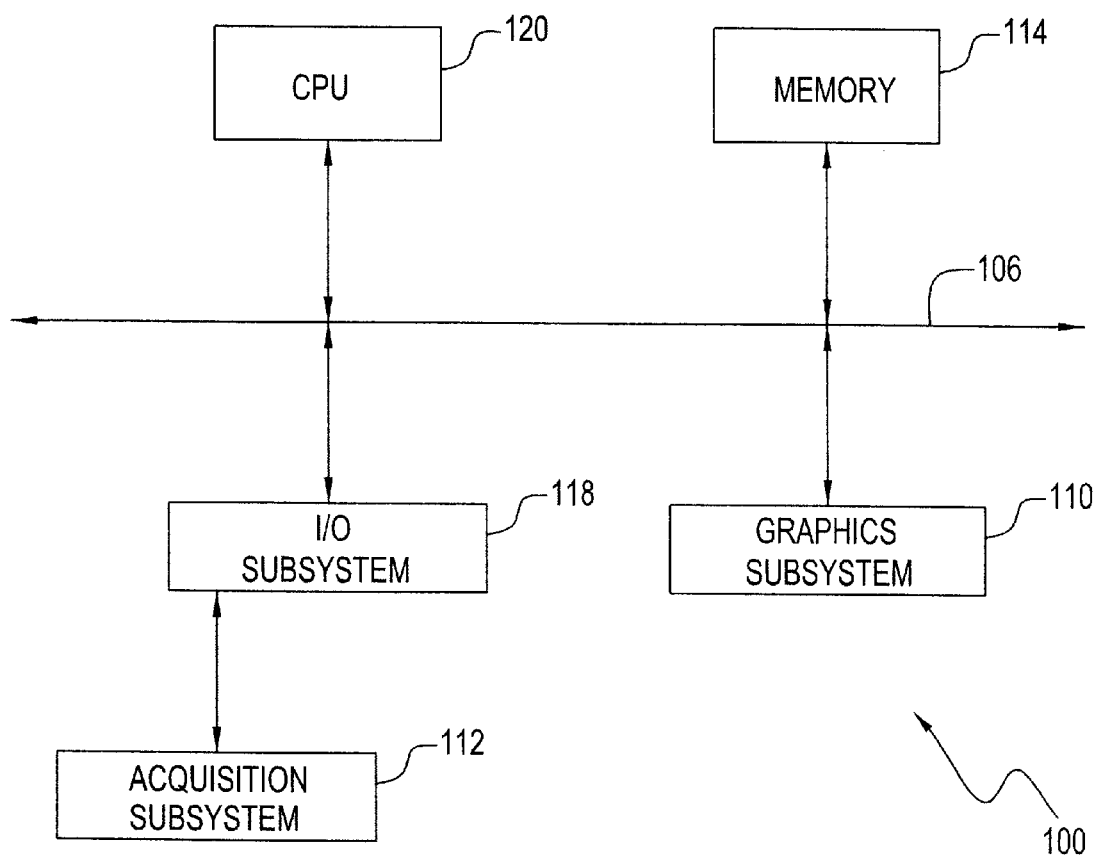
FIG. 11A is a block diagram of a computer system with graphics and 3D data acquisition capabilities that is suitable for practicing this invention.

Having thus described the teachings of this invention, reference can be had now to FIG. 11A for showing a block diagram of a computer system 100 with a graphics subsystem 110 and 3D data acquisition subsystem 112 that is suitable for practicing this invention. A system bus 106 interconnects a CPU 120 (such as a Pentium™-type microprocessor) with the graphics subsystem 110 and a system memory 114. The acquisition subsystem 112 is preferably, but not necessarily, interfaced through an I/O subsystem 118.

It can be appreciated that the memory 114 can include or be loaded from a computer readable medium that embodies a computer program for constructing a digital model of an object in accordance with the teachings herein. In this case the computer program includes a first code segment for inputting surface scan data from a plurality of surface scans, the surface scan data having a first resolution and representing the object from a plurality of viewpoints. The first code segment also inputs image data having a second, higher resolution for representing the object from the plurality of viewpoints. The computer program further includes a second code segment for iteratively registering the surface scan data from the plurality of viewpoints using the image data. The computer program also includes a third code segment for reconstructing substantially seamless surface texture data for the model using the weights that reflect a level of confidence in the data at a plurality of surface points.

Figure 11B:
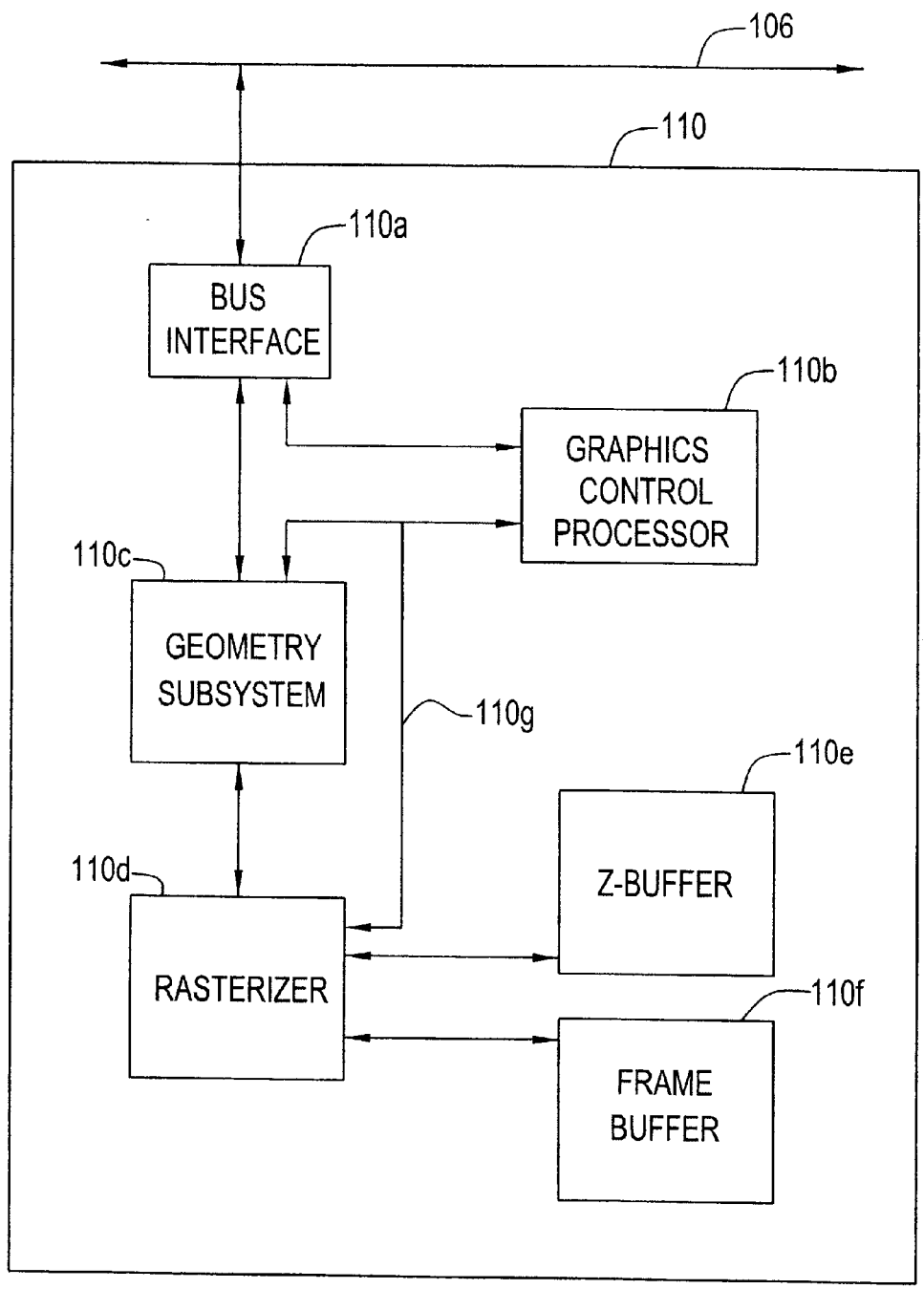
FIG. 11B shows the graphics subsystem in greater detail.

FIG. 11B shows the graphics subsystem 110 in greater detail. A bus interface 110a connects the system bus 106 to a graphics control processor 110b and to a geometry subsystem 110c. A graphics control processor 110b control bus 110g also connects to the geometry subsystem 110c and to a rasterizer 110d. The above-mentioned z-buffer 110e and a frame buffer 110f are also coupled to the rasterizer 110d, and cooperate to render the object models for display, including the high-quality surface texture portion.

Figure 11C:
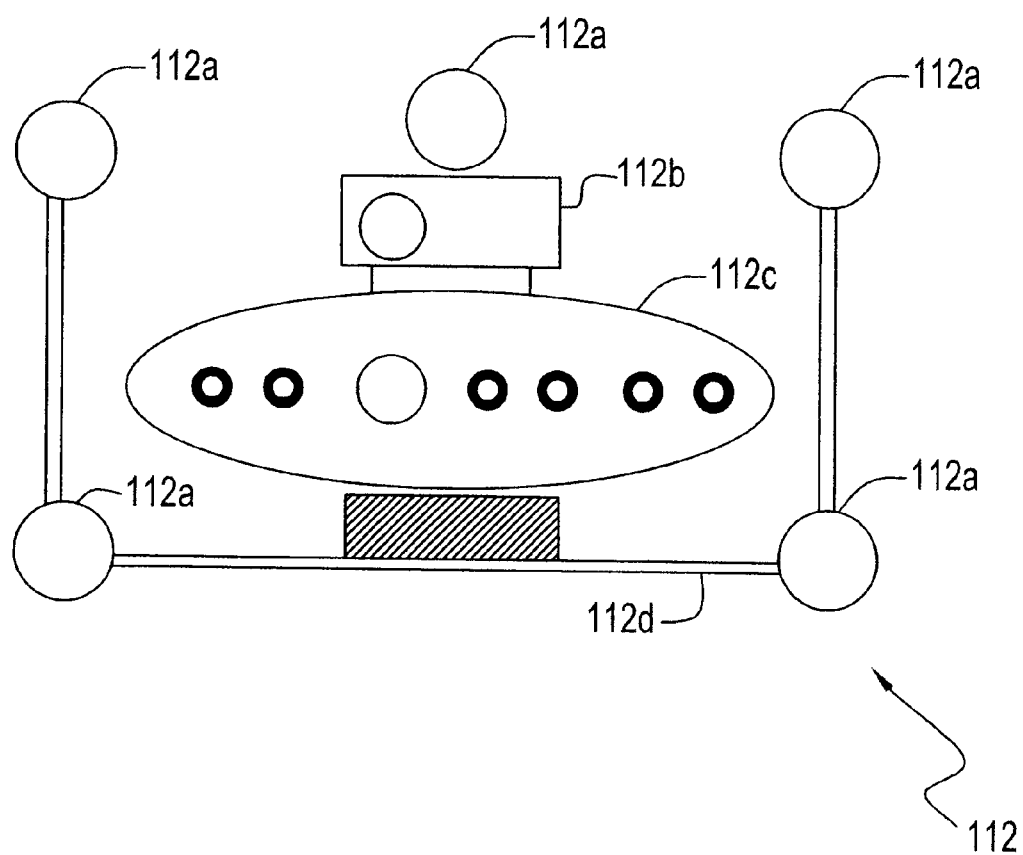
FIG. 11C depicts the 3D data acquisition system in greater detail.

FIG. 11C depicts the 3D data acquisition system 112 in greater detail. A tripod-mounted frame 112d supports a plurality (5) of light sources 112a used for photometric stereo imaging. A suitable total width of the frame 112d and the supported light sources 112a can be 60 cm. Also supported by the frame 112d is a color camera 112b and a scanner with, for example, six black and white cameras and a light striping flash. In operation, and referring now as well to FIG. 11D, a light striping flash projects a set of stripes of light (structured light) 130 onto an object 132 (such as the vase depicted previously). The digital cameras 112C capture the shape of the stripes 130 from different angles. Digital image processing techniques are then used to compute the distance of each pixel on each stripe with respect to the sensor (cameras).

For all but the simplest objects 132, this process is repeated from multiple viewpoints, so that the sensor can "see" every portion of the object's surface (for example, note again FIG. 9C, which shows the 20 scans used to construct the head of the statue). The multiple scans are then registered, or aligned, into a single coordinate frame 134. The measured points can be seen as an unorganized "point cloud".

Next, in FIG. 11F, a scan integration phase forms a triangular mesh 138 that connects the measured points. The result of this operation is a 3D geometric model of the surface of the object 132. In subsequent operations, the mesh can be simplified, texture maps can be applied, or the triangular mesh can be converted to a curved surface representation (e.g., NURBS). FIG. 11G shows a closeup view of the computed triangular mesh of FIG. 11F.

In conclusion, it can be seen that the inventors have developed and herein described a method for generating texture maps for the efficient representation of scanned objects with high visual quality. The inventors have employed a novel image-based registration algorithm that takes into account high-resolution information in the captured images. The geometric alignment is improved by matching image structure around automatically selected points. The refined alignment enables the method to synthesize sharp textures. The presently preferred texture-reconstruction approach employs a weighting scheme to combine the best information at each texture pixel that reduces noise, and which eliminates the evidence of any scan or patch boundaries.

The teachings of this invention should not be construed to be limited to only the specific methods discussed above. For example, the teachings of this invention would apply as well to the interleaving of geometric ICP, image-based alignment, and line-of-sight error correction in the image processing pipeline, as it is expected that an accounting for line-of-sight errors during alignment will produce improved registration results.

Also, at present a relatively simple greedy approach is used to generate the height-field patches. However, this approach may not always guarantee an optimal set of patches, and other techniques may be preferred for use.

Also, while three-dimensional scanning is being used with increasing frequency, it remains a relatively expensive and labor-intensive process. As such, optimizations can be made in the acquisition and model building pipeline, while focusing on methods that employ inexpensive hardware to produce high visual quality.

Thus, while the invention has been particularly shown and described with respect to preferred embodiments thereof, it will be understood by those skilled in the art that changes in form and details may be made therein without departing from the scope and spirit of the invention.

What is claimed is:

1. A method for constructing a digital model of an object, comprising steps of:
   inputting surface scan data from a plurality of surface scans, the surface scan data having a first resolution and representing the object from a plurality of viewpoints;
   inputting image data having a second, higher resolution for representing the object from the plurality of viewpoints;
   iteratively registering the surface scan data from the plurality of viewpoints using the image data;
   reconstructing substantially seamless surface texture data for the model using weight maps of the image data at a plurality of surface points;
   integrating said range data into a mesh representation of the object;
   partitioning the mesh representation into a set of height-field patches; and
   wherein said step of reconstructing substantially seamless surface texture comprises a step of reconstructing new surface textures by projecting intensity maps onto the height-field patches and combining the best data available at each point using the weights.

2. A method as in claim 1, wherein the step of inputting surface scan data comprises steps of projecting structured light onto the object and capturing the shape of the structured light on the surface from different angles.

3. A method as in claim 1, wherein the step of registering comprises a step of processing range, albedo, and surface normal data.

4. A method as in claim 1, wherein the step of inputting image data comprises a step of operating a high-resolution digital camera that acquires intensity images under controlled lighting conditions.

5. A method as in claim 4, and further comprising a step of computing illumination-invariant normal and albedo maps of the surface using the intensity images.

6. A method as in claim 5, wherein the albedo maps are used in said registering step to register, one to another, a plurality of individual range images that comprise said surface scan data.

7. A method as in claim 1, wherein the weights are proportional to a ratio of a projected surface area to a true area of the surface represented by an image pixel.

8. A method as in claim 7, wherein the ratio is computed based on a distance from a corresponding point on the surface to a center of the camera that obtains the image data, and the scalar product between a surface normal and a view direction, wherein the weight is larger at image pixels computed from the image data, and wherein the weight of a pixel decreases as the distance to a scan boundary becomes smaller.

9. A method as in claim 1, wherein the step of iteratively registering employs detail maps computed from texture maps to generate pairs of corresponding points on scans, the pairs of points being generated by matching their image neighborhoods using an automated process.

10. A method as in claim 9, wherein surface scan data for individual ones of the plurality of surface scans are considered for alignment in random order, while other surface scans remain fixed.

11. A method for constructing a digital model of an object, comprising the steps of:
    inputting surface scan data from a plurality of surface scans, the surface scan data having a first resolution and representing the object from a plurality of viewpoints;
    inputting image data having a second, higher resolution for representing the object from the plurality of viewpoints;
    iteratively registering the surface scan data from the plurality of viewpoints using the image data; and
    reconstructing substantially seamless surface texture data for the model using weight maps of the image data at a plurality of surface points, wherein the step of iteratively registering employs detail maps computed from texture maps to generate pairs of corresponding points on scans, the pairs of points being generated by matching their image neighborhoods using an automated process, wherein surface scan data for individual ones of the plurality of surface scans are considered for alignment in random order, while other surface scans remain fixed, and wherein for surface scan data to be aligned, sample points are selected automatically on the corresponding detail map in regions where features of interest are present, wherein the detail maps corresponding to all overlapping scans are projected onto a current image plane and a search is performed in the neighborhood of each sample point for a best match in the overlapping areas of the projected detail maps; wherein resulting pairs of image point samples are back-projected onto their corresponding surface scan geometry and used to compute a rigid transformation that minimizes the sum of squared distances between corresponding points; and wherein the transformation thus obtained is applied in an interactive manner until a convergence criterion is satisfied.

12. A method as in claim 1, wherein a depth map is stored with each scan and used such that occluded parts of the object's surface are discarded and a corresponding portion of a detail map receives no surface texture.

13. A system for constructing a digital model of an object, comprising:
    an imaging system for generating object surface scan data from a plurality of surface scans, the surface scan data having a first resolution and representing the object from a plurality of viewpoints, said imaging system further generating image data having a second, higher resolution than the surface scan data for representing the object from the plurality of viewpoints; and
    a data processor for iteratively registering the surface scan data for the plurality of surface scans using the image data for reconstructing substantially seamless surface texture data for the model using weight maps of the image data at a plurality of surface points, wherein said surface scan data comprises range data, and wherein said data processor is responsive to said range data for integrating said range data into a mesh representation of the object and for partitioning the mesh representation into a set of height-field patches, and where said data processor, when operating to reconstruct the substantially seamless surface texture, reconstructs new surface textures by projecting intensity maps onto the height-field patches and combining the best data available at each point using the weights.

14. A system as in claim 13, wherein the weights are proportional to a ratio of a projected surface area to a true area of the surface represented by an image pixel.

15. A system as in claim 14, wherein the ratio is computed based on a distance from a corresponding point on the surface to a center of the camera that obtains the image data, and the scalar product between a surface normal and a view direction, wherein the weight is larger at image pixels computed from the image data, and wherein the weight of a pixel decreases as the distance to a scan boundary becomes smaller.

16. A system as in claim 13, wherein said data processor, when operating to iteratively register the surface scan data employs detail maps computed from texture maps to generate pairs of corresponding points on scans, the pairs of points being generated by matching their image neighborhoods using an automated process.

17. A system as in claim 16, wherein surface scan data for individual ones of the plurality of surface scans are considered for alignment in random order, while other surface scans remain fixed.

18. A computer program embodied on a computer readable medium for constructing a digital model of an object, comprising:
a code segment for inputting surface scan data from a plurality of surface scans, the surface scan data having a first resolution and representing the object from a plurality of viewpoints and for inputting image data having a second, higher resolution for representing the object from the plurality of viewpoints;
a code segment for iteratively registering the surface scan data from the plurality of viewpoints using the image data; and
a code segment for reconstructing substantially seamless surface texture data for the model using weight maps of the image data at a plurality of surface points, wherein said surface scan data comprises range data, and further comprising a code segment that operates in response to said range data for integrating said range data into a mesh representation of the object and for partitioning the mesh representation into a set of height-field patches, and where said code segment that reconstructs the substantially seamless surface texture, reconstructs new surface textures by projecting to intensity maps onto the height-field patches and combining the best data available at each point using the weights.

19. A computer program as in claim 18, wherein the weights are proportional to a ratio of a projected surface area to a true area of the surface represented by an image pixel.

20. A computer program as in claim 19, wherein the ratio is computed based on a distance from a corresponding point on the surface to a center of the camera that obtains the image data, and the scalar product between a surface normal and a view direction, wherein the weight is larger at image pixels computed from the image data, and wherein the weight of a pixel decreases as the distance to a scan boundary becomes smaller.

21. A computer program as in claim 18, wherein said code segment that operates to iteratively register the surface scan data employs detail maps computed from texture maps to generate pairs of corresponding points on scans, the pairs of points being generated by matching their image neighborhoods using an automated process.

22. A computer program as in claim 21, wherein surface scan data for individual ones of the plurality of surface scans are considered for alignment in random order, while other surface scans remain fixed.

23. A method as in claim 1, wherein each of said surface scans is a two dimensional range image of three dimensional points.

24. A method as in claim 1, wherein said reconstructing step combines color images taken from said plurality of viewpoints to form a color texture map.

25. A method as in claim 5, wherein said intensity images are color images.

* * * * *